(12) United States Patent
Manolakos et al.

(10) Patent No.: US 12,309,813 B2
(45) Date of Patent: May 20, 2025

(54) TRANSMISSION-RECEPTION POINT (TRP) ASSOCIATION FOR POSITIONING MEASUREMENTS PERFORMED ON PHYSICAL DOWNLINK CHANNELS

(71) Applicant: QUALCOMM Incorporated, San Diego, CA (US)

(72) Inventors: Alexandros Manolakos, Escondido, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 997 days.

(21) Appl. No.: 17/318,882

(22) Filed: May 12, 2021

(65) Prior Publication Data

US 2021/0360611 A1 Nov. 18, 2021

Related U.S. Application Data

(60) Provisional application No. 63/026,262, filed on May 18, 2020.

(51) Int. Cl.
*H04W 72/51* (2023.01)
*H04L 5/00* (2006.01)
(Continued)

(52) U.S. Cl.
CPC ........... *H04W 72/51* (2023.01); *H04L 5/0051* (2013.01); *H04W 24/10* (2013.01);
(Continued)

(58) Field of Classification Search
None
See application file for complete search history.

(56) References Cited

U.S. PATENT DOCUMENTS

| 2019/0379506 A1 | 12/2019 | Cheng |
| 2020/0007194 A1 | 1/2020 | John Wilson et al. |

(Continued)

FOREIGN PATENT DOCUMENTS

| CN | 110690950 A | 1/2020 |
| WO | WO-2019097478 A1 | 5/2019 |

(Continued)

OTHER PUBLICATIONS

Author Unknown, MAC CE signaling enhancement for TCI indication of single-PDCCH based multi-TRP transmission, Doc. No. R2-1914674, pp. 1-5, (Year: Nov. 22, 2019).*

(Continued)

*Primary Examiner* — Christopher M Crutchfield
(74) *Attorney, Agent, or Firm* — Thien T. Nguyen

(57) ABSTRACT

Disclosed are techniques for wireless communication. In an aspect, a user equipment (UE) receives one or more physical downlink control channels (PDCCHs), one or more physical downlink shared channels (PDSCHs), or both from at least a first transmission-reception point (TRP), a second TRP, or both, performs one or more positioning measurements of the one or more PDCCHs, the one or more PDSCHs, or both, and reports, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both.

66 Claims, 19 Drawing Sheets

(51) Int. Cl.
  *H04W 24/10* (2009.01)
  *H04W 72/0453* (2023.01)
  *H04W 72/23* (2023.01)
  *H04W 76/11* (2018.01)

(52) U.S. Cl.
  CPC ....... *H04W 72/0453* (2013.01); *H04W 72/23* (2023.01); *H04W 76/11* (2018.02)

(56) References Cited

U.S. PATENT DOCUMENTS

| | | | |
|---|---|---|---|
| 2020/0037385 A1* | 1/2020 | Park | H04W 56/001 |
| 2020/0383091 A1 | 12/2020 | Park et al. | |
| 2021/0111851 A1* | 4/2021 | Lin | H04W 24/10 |
| 2021/0120519 A1 | 4/2021 | Si et al. | |
| 2021/0373148 A1* | 12/2021 | Chen | G01S 13/765 |
| 2022/0191892 A1* | 6/2022 | Muruganathan | H04B 7/0695 |
| 2023/0132040 A1* | 4/2023 | Gao | H04W 72/23 370/329 |

FOREIGN PATENT DOCUMENTS

WO PCT/CN2020/074861 * 2/2020
WO WO-2020028517 A1 2/2020

OTHER PUBLICATIONS

Author Unknown, Summary of DL MAC CE design for agenda 6.16.3, Doc. No. R2-2001551, pp. 1-5, (Year: Mar. 6, 2020).*
Author Unknown, Email discussion summary on eMIMO MAC CE, Doc. No. R2-1914710, pp. 1-16, (Year: Nov. 22, 2019).*
Ericsson, et al., "Measurement Reporting for UE Based Positioning," 3GPP Draft, 3GPP TSG-RAN WG2 109-bis, R2-2003811, 3rd Generation Partnership Project (3GPP), Mobile Competence Centre, 650, Route Des Lucioles, F-06921, Sophia-Antipolis Cedex, France, vol. RAN WG2. No. Electronic Meeting, 2, 0200420-20200430, Apr. 16, 2020 (Apr. 16, 2020), XP051876526, pp. 1-8, Retrieved from the Internet: URL:—https://ftp.3gpp.org/tsg_ran/WG2_RL2/TSGR2_109bis-e/Docs/R2-2003811.zip R2-2003811 Measurement Reporting.docx [retrieved on Apr. 16, 2020] Paraghraph "2.2 Location Information Provisioing".
Intel Corporation: "Summary for NR-Positioning AI—7.2.10.1.1 DL Only Based Positioning", 3GPP Draft, 3GPP TSG RAN WG1 Meeting #96, R1-1903394—Intel—NR POS AI 7.2.10.1.1—DL POS, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 26, 2019 (Feb. 26, 2019), XP051601069, 22 pages, Retrieved from the Internet: URL: http://www.3gpp.org/ftp/tsg%5Fran/WG1%5FRL1/TSGR1%5F96/Docs/R1%2D1903394%2Ezip, [retrieved on Feb. 26, 2019], Paragraph "Aspect 18: Mapping of DL Reference Signals to UE Measurements" Paragraph "Observation and Proposal" p. 19-p. 20, the whole document.
International Search Report and Written Opinion—PCT/US2021/032213—ISA/EPO—Sep. 9, 2021.
Moderator (CATT): "FL Summary of Remaining Issues on NR Positioning Measurements", 3GPP TSG RAN WG1 #100bis, R1-2002716, e-Meeting 2, Apr. 20-30, 2020, pp. 1-12, Chapter 2.7.
Moderator (OPPO): "FL Summary #2 for Multi-TRP/Panel Transmission", 3GPP TSG RAN WG1 #100bis, R1-2002730, e-Meeting, Apr. 20-30, 2020, 50 Pages, Chapters 2.1, 2.2, 2.4, 2.6, 2.8, 2.15, 3.1, 3.4, 3.5, 3.7, 3.8, 3.9, 3.10, 4.2, 4.5 and 4.11.
Taiwan Search Report—TW110117251—TIPO—Nov. 28, 2024.

* cited by examiner

User Plane Protocol Stack

Control Plane Protocol Stack

```
SSB-Configuration-r16  ::=   SEQUENCE {
    carrierFreq-r16                 ARFCN-ValueNR,
    halfFrameIndex-r16              ENUMERATED {zero, one},
    ssbSubcarrierSpacing-r16        SubcarrierSpacing,
    ssb-periodicity-r16             ENUMERATED { ms5, ms10, ms20, ms40, ms80, ms160,
spare2,spare1 }
    smtc-r16                        SSB-MTC                         OPTIONAL
    sfn-Offset-r16                  INTEGER (0..maxNumFFS),
    sfn-SSB-Offset-r16              INTEGER (0..15),
    ss-PBCH-BlockPower-r16          INTEGER (-60..50)               OPTIONAL
}
SSB-InfoNcell-r16    ::=   SEQUENCE {
    physicalCellId-r16              PhysCellId,
    ssb-IndexNcell-r16              SSB-Index,
    ssb-Configuration-r16           SSB-Configuration-r16           OPTIONAL
DL-PRS-Info-r16      ::=   SEQUENCE {
    trp-Id-r16                      INTEGER (0..255),
    dl-PRS-ResourceSetId-r16        INTEGER (0..7),
    dl-PRS-ResourceId-r16           INTEGER (0..63)                 OPTIONAL
}
```

TRANSMISSION-RECEPTION POINT (TRP) ASSOCIATION FOR POSITIONING MEASUREMENTS PERFORMED ON PHYSICAL DOWNLINK CHANNELS

CROSS-REFERENCE TO RELATED APPLICATIONS

The present application for patent claims the benefit of U.S. Provisional Application No. 63/026,262, entitled "TRANSMISSION-RECEPTION POINT (TRP) ASSOCIATION FOR POSITIONING MEASUREMENTS PERFORMED ON PHYSICAL DOWNLINK CHANNELS," filed May 18, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving one or more physical downlink control channels (PDCCHs), one or more physical downlink shared channel (PDSCHs), or both from at least a first transmission-reception point (TRP), a second TRP, or both; performing one or more positioning measurements of the one or more PDCCHs, the one or more PDSCHs, or both; and reporting, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both.

In an aspect, a method of wireless communication performed by a user equipment (UE) includes receiving one or more physical downlink control channels (PDCCHs), one or more physical downlink shared channels (PDSCHs), or both from at least a first transmission-reception point (TRP), a second TRP, or both; performing one or more positioning measurements of the one or more PDCCHs, the one or more PDSCHs, or both; receiving a mapping between a quasi-co-location (QCL) source associated with the one or more PDCCHs, the one or more PDSCHs, or both, one or more properties of the QCL source, or both, and TRP identifiers of at least the first TRP and the second TRP; and reporting, to a location server, the one or more positioning measurements and a TRP identifier of whichever of the first TRP and the second TRP transmitted the one or more PDCCHs, the one or more PDSCHs, or both based on the mapping.

In an aspect, a method of wireless communication performed by a network node includes receiving, from a user equipment (UE), one or more positioning measurements of one or more physical downlink control channels (PDCCHs), one or more physical downlink shared channels (PDSCHs), or both received at the UE from at least a first transmission-reception point (TRP), a second TRP, or both, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and determining a TRP identifier of whichever of the first TRP and the second TRP transmitted the one or more PDCCHs, the one or more PDSCHs, or both based on at least the timestamp and the one or more properties of the QCL source.

In an aspect, a user equipment (UE) includes a memory; at least one transceiver; and at least one processor communicatively coupled to the memory and the at least one transceiver, the at least one processor configured to: receive, via the at least one transceiver, one or more physical downlink control channels (PDCCHs), one or more physical downlink shared channels (PDSCHs), or both from at least a first transmission-reception point (TRP), a second TRP, or both; perform one or more positioning measurements of the one or more PDCCHs, the one or more PDSCHs, or both; and report, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both.

In an aspect, a user equipment (UE) includes a memory; at least one transceiver; and at least one processor communicatively coupled to the memory and the at least one transceiver, the at least one processor configured to: receive, via the at least one transceiver, one or more physical downlink control channels (PDCCHs), one or more physical downlink shared channels (PDSCHs), or both from at least a first transmission-reception point (TRP), a second TRP, or both; perform one or more positioning measurements of the one or more PDCCHs, the one or more PDSCHs, or both; receive, via the at least one transceiver, a mapping between a quasi-co-location (QCL) source associated with the one or more PDCCHs, the one or more PDSCHs, or both, one or more properties of the QCL source, or both, and TRP identifiers of at least the first TRP and the second TRP; and report, to a location server, the one or more positioning measurements and a TRP identifier of whichever of the first TRP and the second TRP transmitted the one or more PDCCHs, the one or more PDSCHs, or both based on the mapping.

In an aspect, a network node includes a memory; at least one transceiver; and at least one processor communicatively coupled to the memory and the at least one transceiver, the at least one processor configured to: receive, via the at least one transceiver, from a user equipment (UE), one or more positioning measurements of one or more physical downlink control channels (PDCCHs), one or more physical downlink shared channels (PDSCHs), or both received at the UE from at least a first transmission-reception point (TRP), a second TRP, or both, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and determine a TRP identifier of whichever of the first TRP and the second TRP transmitted the one or more PDCCHs, the one or more PDSCHs, or both based on at least the timestamp and the one or more properties of the QCL source.

In an aspect, a user equipment (UE) includes means for receiving one or more physical downlink control channels (PDCCHs), one or more physical downlink shared channels (PDSCHs), or both from at least a first transmission-reception point (TRP), a second TRP, or both; means for performing one or more positioning measurements of the one or more PDCCHs, the one or more PDSCHs, or both; and means for reporting, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both.

In an aspect, a user equipment (UE) includes means for receiving one or more physical downlink control channels (PDCCHs), one or more physical downlink shared channels (PDSCHs), or both from at least a first transmission-reception point (TRP), a second TRP, or both; means for performing one or more positioning measurements of the one or more PDCCHs, the one or more PDSCHs, or both; means for receiving a mapping between a quasi-co-location (QCL) source associated with the one or more PDCCHs, the one or more PDSCHs, or both, one or more properties of the QCL source, or both, and TRP identifiers of at least the first TRP and the second TRP; and means for reporting, to a location server, the one or more positioning measurements and a TRP identifier of whichever of the first TRP and the second TRP transmitted the one or more PDCCHs, the one or more PDSCHs, or both based on the mapping.

In an aspect, a network node includes means for receiving, from a user equipment (UE), one or more positioning measurements of one or more physical downlink control channels (PDCCHs), one or more physical downlink shared channels (PDSCHs), or both received at the UE from at least a first transmission-reception point (TRP), a second TRP, or both, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and means for determining a TRP identifier of whichever of the first TRP and the second TRP transmitted the one or more PDCCHs, the one or more PDSCHs, or both based on at least the timestamp and the one or more properties of the QCL source.

In an aspect, a non-transitory computer-readable medium stores computer-executable instructions that, when executed by a user equipment (UE), cause the UE to: receive one or more physical downlink control channels (PDCCHs), one or more physical downlink shared channels (PDSCHs), or both from at least a first transmission-reception point (TRP), a second TRP, or both; perform one or more positioning measurements of the one or more PDCCHs, the one or more PDSCHs, or both; and report, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both.

In an aspect, a non-transitory computer-readable medium stores computer-executable instructions that, when executed by a user equipment (UE), cause the UE to: receive one or more physical downlink control channels (PDCCHs), one or more physical downlink shared channels (PDSCHs), or both from at least a first transmission-reception point (TRP), a second TRP, or both; perform one or more positioning measurements of the one or more PDCCHs, the one or more PDSCHs, or both; receive a mapping between a quasi-co-location (QCL) source associated with the one or more PDCCHs, the one or more PDSCHs, or both, one or more properties of the QCL source, or both, and TRP identifiers of at least the first TRP and the second TRP; and report, to a location server, the one or more positioning measurements and a TRP identifier of whichever of the first TRP and the second TRP transmitted the one or more PDCCHs, the one or more PDSCHs, or both based on the mapping.

In an aspect, a non-transitory computer-readable medium stores computer-executable instructions that, when executed by a network node, cause the network node to: receive, from a user equipment (UE), one or more positioning measurements of one or more physical downlink control channels (PDCCHs), one or more physical downlink shared channels (PDSCHs), or both received at the UE from at least a first transmission-reception point (TRP), a second TRP, or both, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and determine a TRP identifier of whichever of the first TRP and the second TRP transmitted the one or more PDCCHs, the one or more PDSCHs, or both based on at least the timestamp and the one or more properties of the QCL source.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 11 illustrates various synchronization signal block (SSB) information elements (IEs) that can be used to determine a physical cell identifier (PCI).

DETAILED DESCRIPTION

Figure 1:
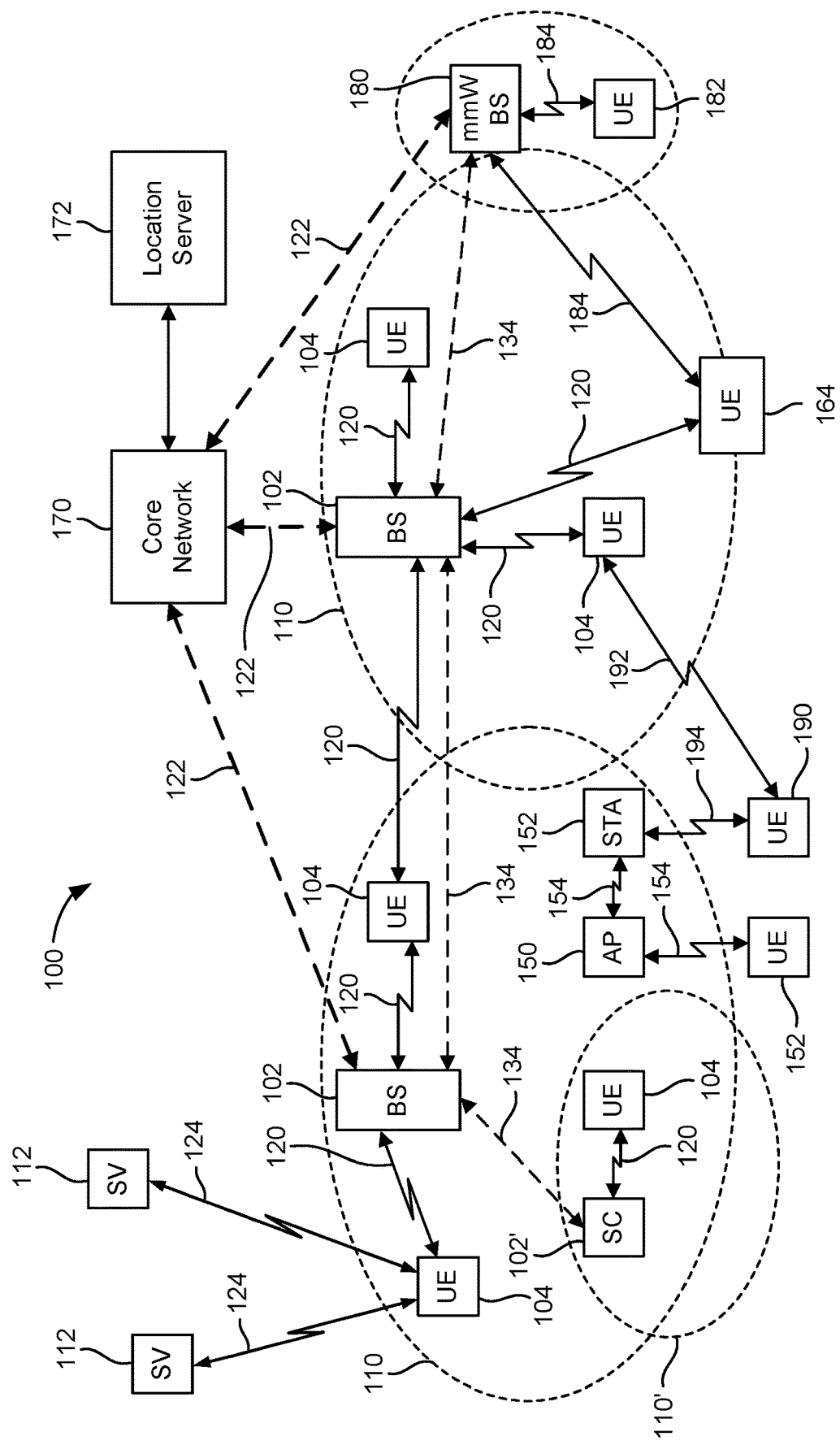
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
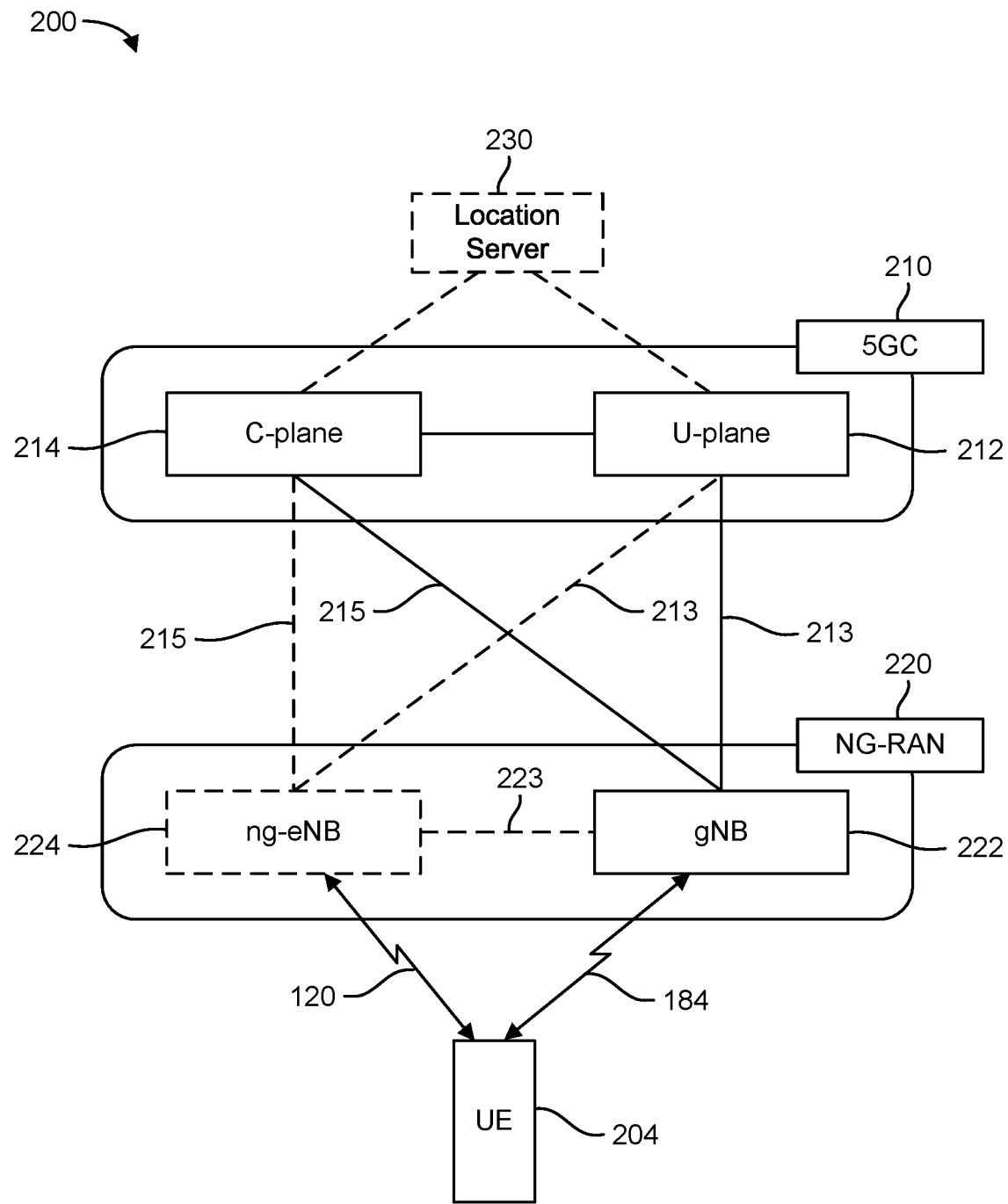
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
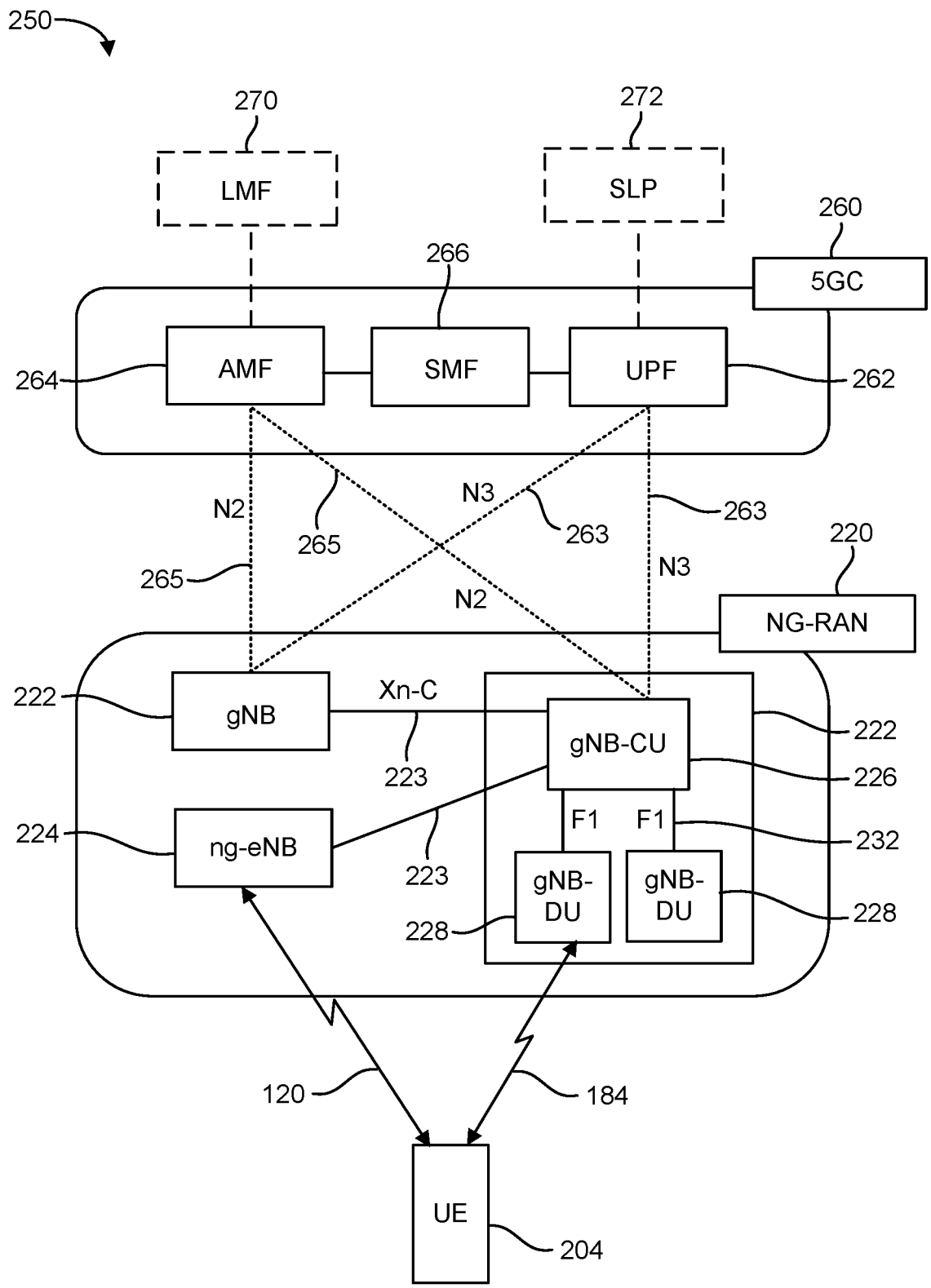

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
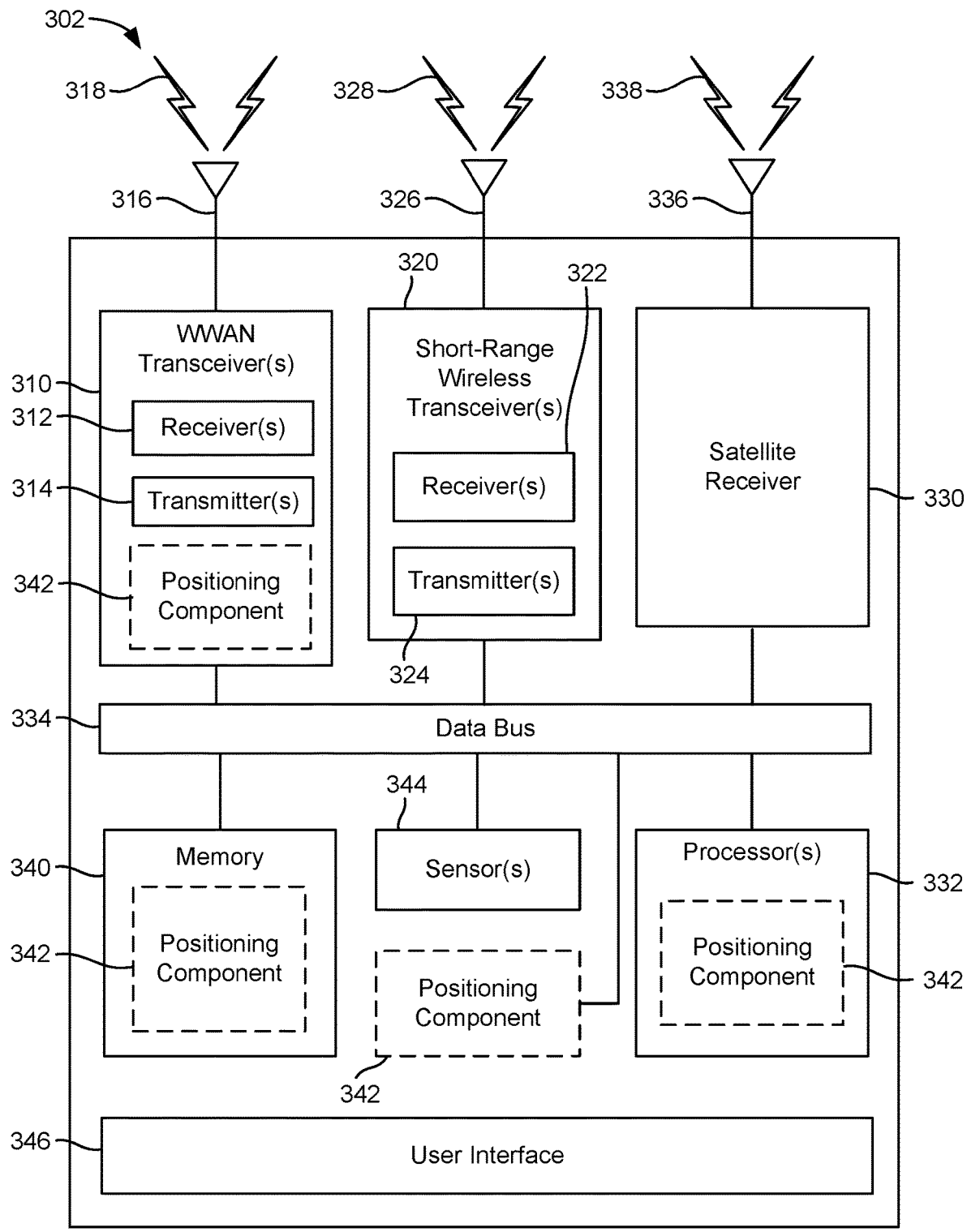
FIGS. 3A, 3B, and 3C are simplified block diagrams of several sample aspects of components that may be employed in a user equipment (UE), a base station, and a network entity, respectively, and configured to support communications as taught herein.
Figure 3B:
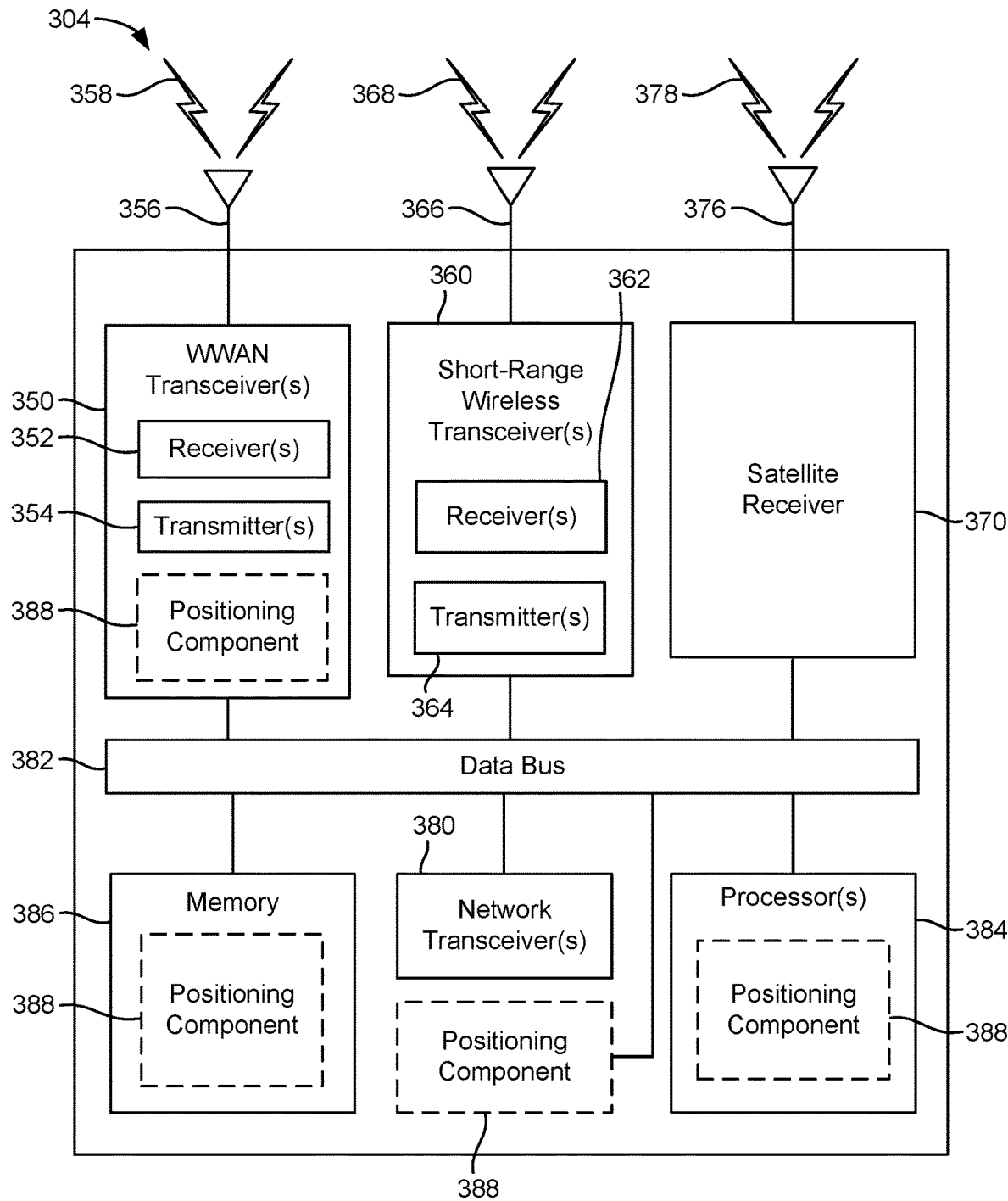
Figure 3C:
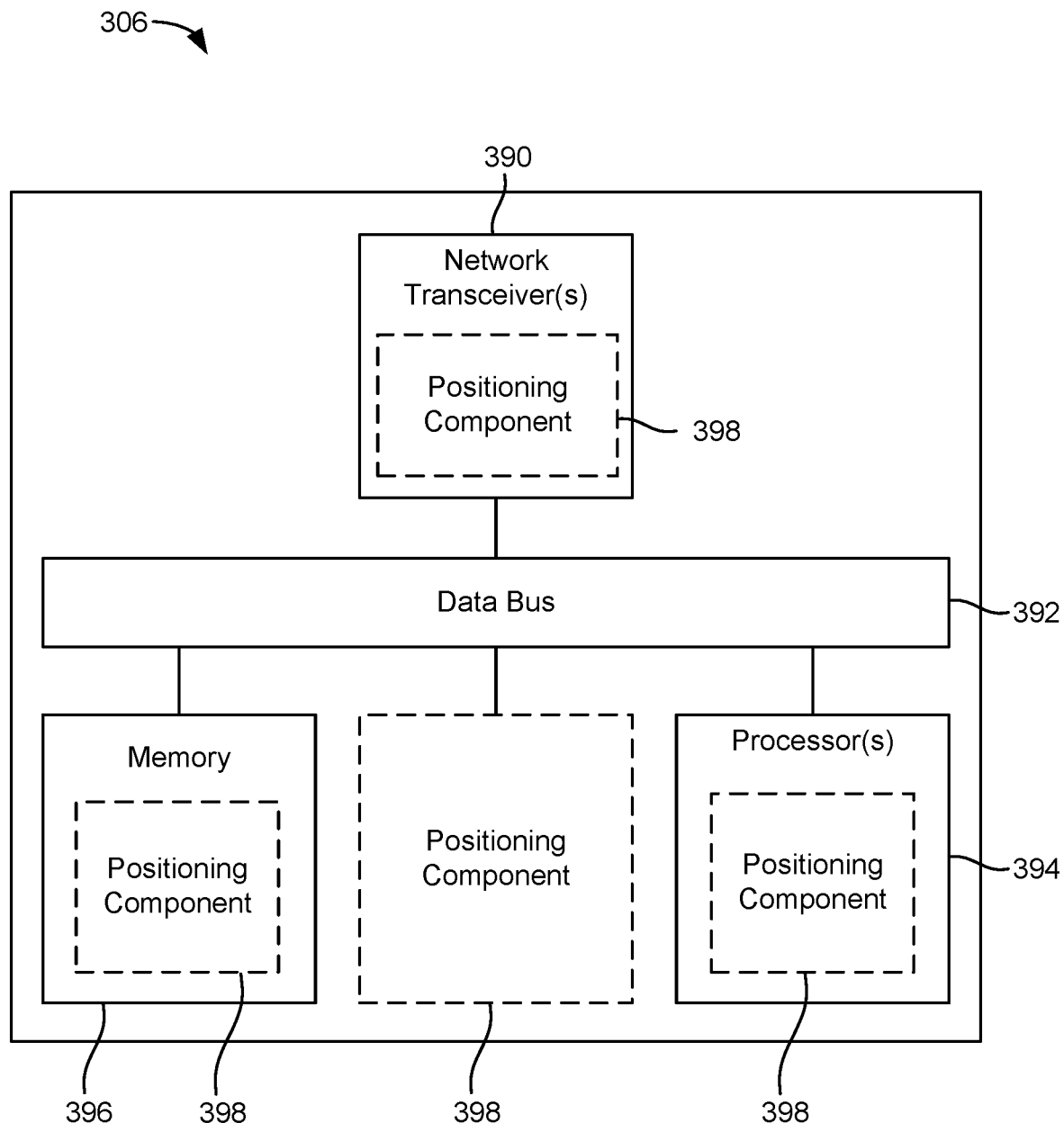

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4A:
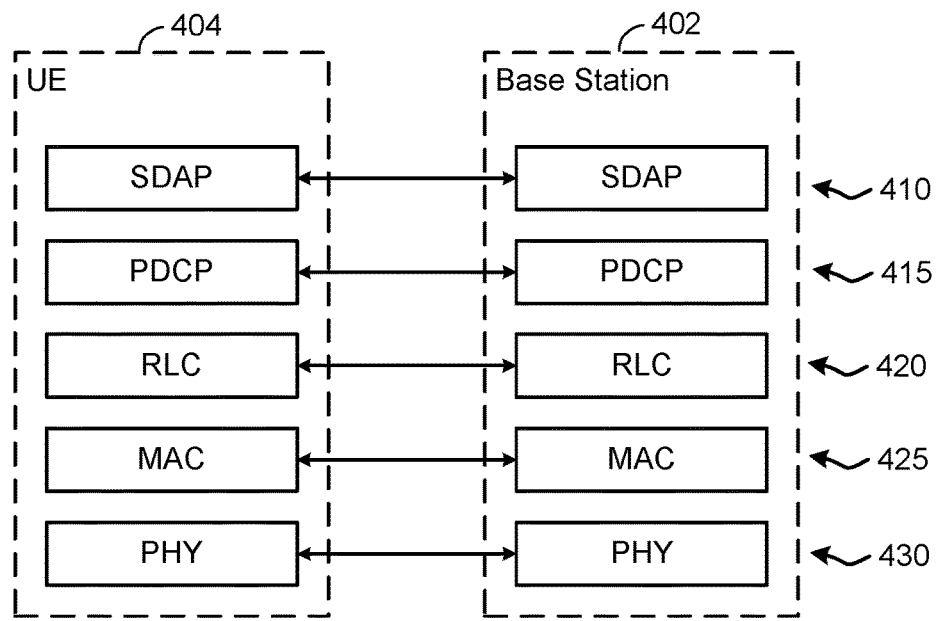
FIGS. 4A and 4B illustrate user plane and control plane protocol stacks, according to aspects of the disclosure.

FIG. 4A illustrates a user plane protocol stack, according to aspects of the disclosure. As illustrated in FIG. 4A, a UE 404 and a base station 402 (which may correspond to any of the UEs and base stations, respectively, described herein) implement, from highest layer to lowest, a service data adaptation protocol (SDAP) layer 410, a packet data convergence protocol (PDCP) layer 415, a radio link control (RLC) layer 420, a medium access control (MAC) layer 425, and a physical (PHY) layer 430. Particular instances of a protocol layer are referred to as protocol "entities." As such, the terms "protocol layer" and "protocol entity" may be used interchangeably.

As illustrated by the double-arrow lines in FIG. 4A, each layer of the protocol stack implemented by the UE 404 communicates with the same layer of the base station 402, and vice versa. The two corresponding protocol layers/entities of the UE 404 and the base station 402 are referred to as "peers," "peer entities," and the like. Collectively, the SDAP layer 410, the PDCP layer 415, the RLC layer 420, and the MAC layer 425 are referred to as "Layer 2" or "L2." The PHY layer 430 is referred to as "Layer 1" or "L1."

Figure 4B:
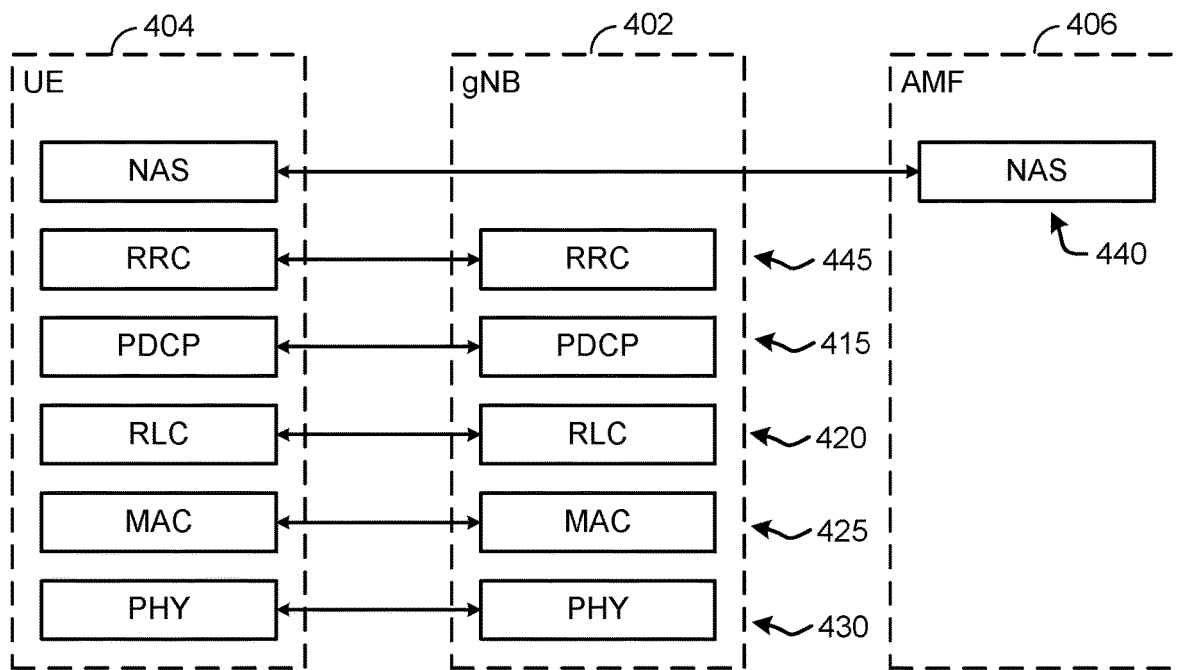

FIG. 4B illustrates a control plane protocol stack, according to aspects of the disclosure. In addition to the PDCP layer 415, the RLC layer 420, the MAC layer 425, and the PHY layer 430, the UE 404 and the base station 402 also implement a radio resource control (RRC) layer 445. Further, the UE 404 and an AMF 406 implement a non-access stratum (NAS) layer 440.

The RLC layer 420 supports three transmission modes for packets: transparent mode (TM), unacknowledged mode (UM), and acknowledged mode (AM). In TM mode, there is no RLC header, no segmentation/reassembly, and no feedback (i.e., no acknowledgment (ACK) or negative acknowledgment (NACK)). In addition, there is buffering at the transmitter only. In UM mode, there is an RLC header, buffering at both the transmitter and the receiver, and segmentation/reassembly, but no feedback (i.e., a data transmission does not require any reception response (e.g., ACK/NACK) from the receiver). In AM mode, there is an RLC header, buffering at both the transmitter and the receiver, segmentation/reassembly, and feedback (i.e., a data transmission requires a reception response (e.g., ACK/NACK) from the receiver). Each of these modes can be used to both transmit and receive data. In TM and UM modes, a separate RLC entity is used for transmission and reception, whereas in AM mode, a single RLC entity performs both transmission and reception. Note that each logical channel uses a specific RLC mode. That is, the RLC configuration is per logical channel with no dependency on numerologies and/or transmission time interval (TTI) duration (i.e., the duration of a transmission on the radio link). Specifically, the broadcast control channel (BCCH), paging control channel (PCCH), and common control channel (CCCH) use TM mode only, the dedicated control channel (DCCH) uses AM mode only, and the dedicated traffic channel (DTCH) uses UM or AM mode. Whether the DTCH uses UM or AM is determined by RRC messaging.

The main services and functions of the RLC layer 420 depend on the transmission mode and include transfer of upper layer protocol data units (PDUs), sequence numbering independent of the one in the PDCP layer 415, error correction through automatic repeat request (ARQ), segmentation and re-segmentation, reassembly of service data units (SDUs), RLC SDU discard, and RLC re-establishment. The ARQ functionality provides error correction in AM mode, and has the following characteristics: ARQ retransmissions of RLC PDUs or RLC PDU segments based on RLC status reports, polling for an RLC status report when needed by RLC, and RLC receiver triggering of an RLC status report after detection of a missing RLC PDU or RLC PDU segment.

The main services and functions of the PDCP layer 415 for the user plane include sequence numbering, header compression and decompression (for robust header compression (ROHC)), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a quality of service (QoS) flow and a data radio bearer and marking QoS flow identifier in both downlink and uplink packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., New RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain Internet protocol (IP) connectivity between the UE 404 and the packet data network (PDN). The NAS layer 440 performs evolved packet system (EPS) bearer management, authentication, EPS connection management (ECM)-IDLE mobility handling, paging origination in ECM-IDLE, and security control.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5A:
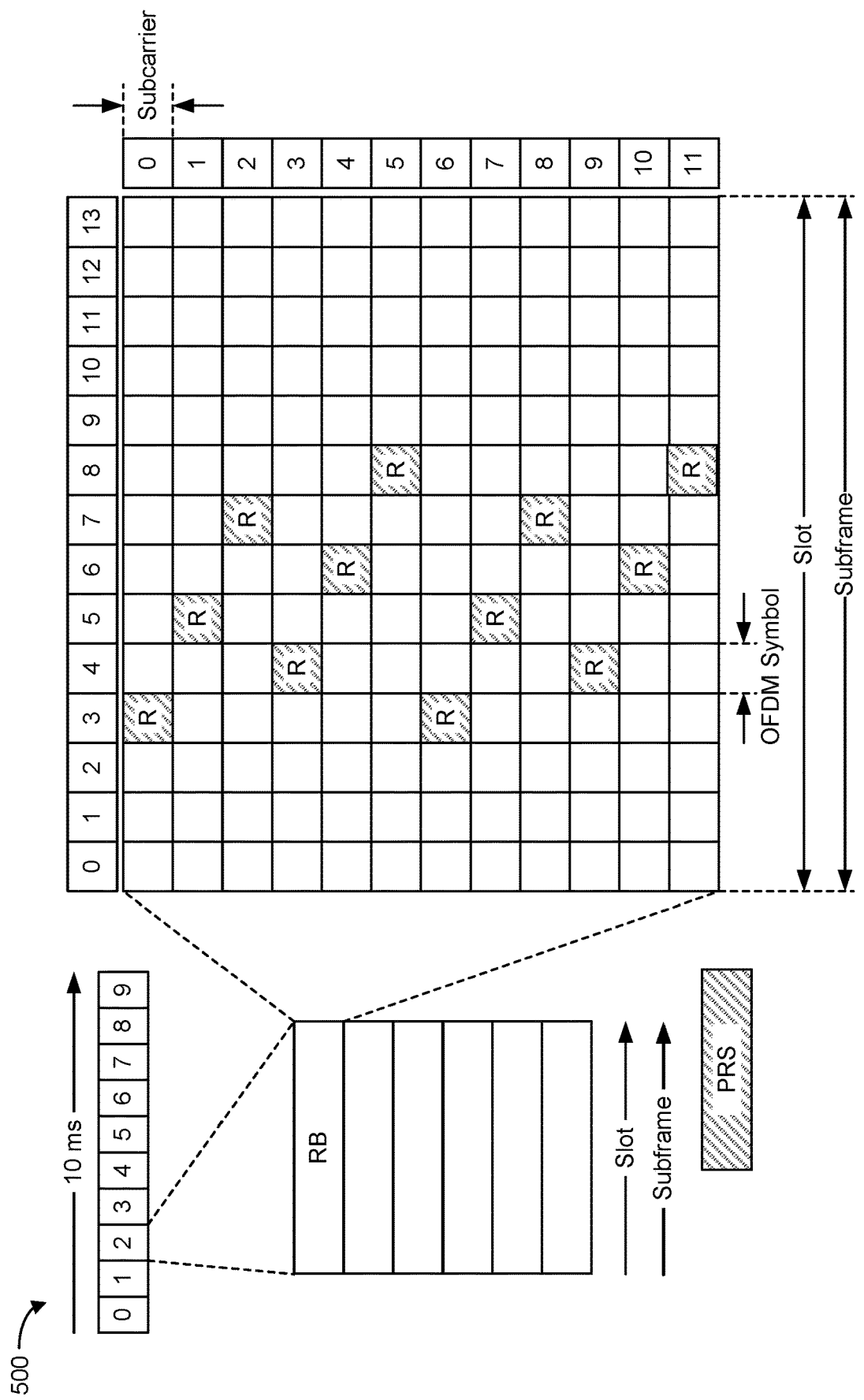
FIGS. 5A to 5D are diagrams illustrating example frame structures and channels within the frame structures, according to aspects of the disclosure.
Figure 5B:
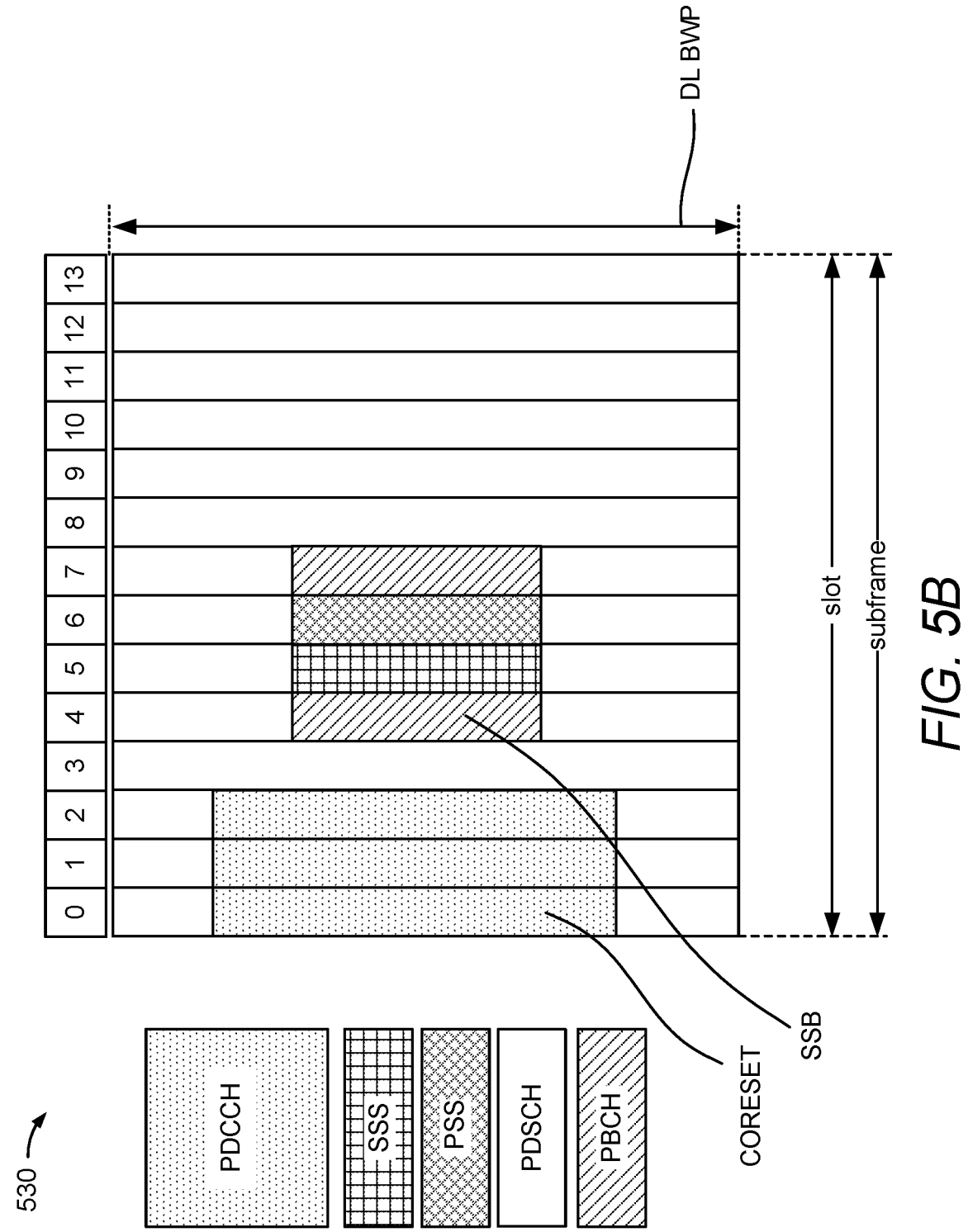
Figure 5C:
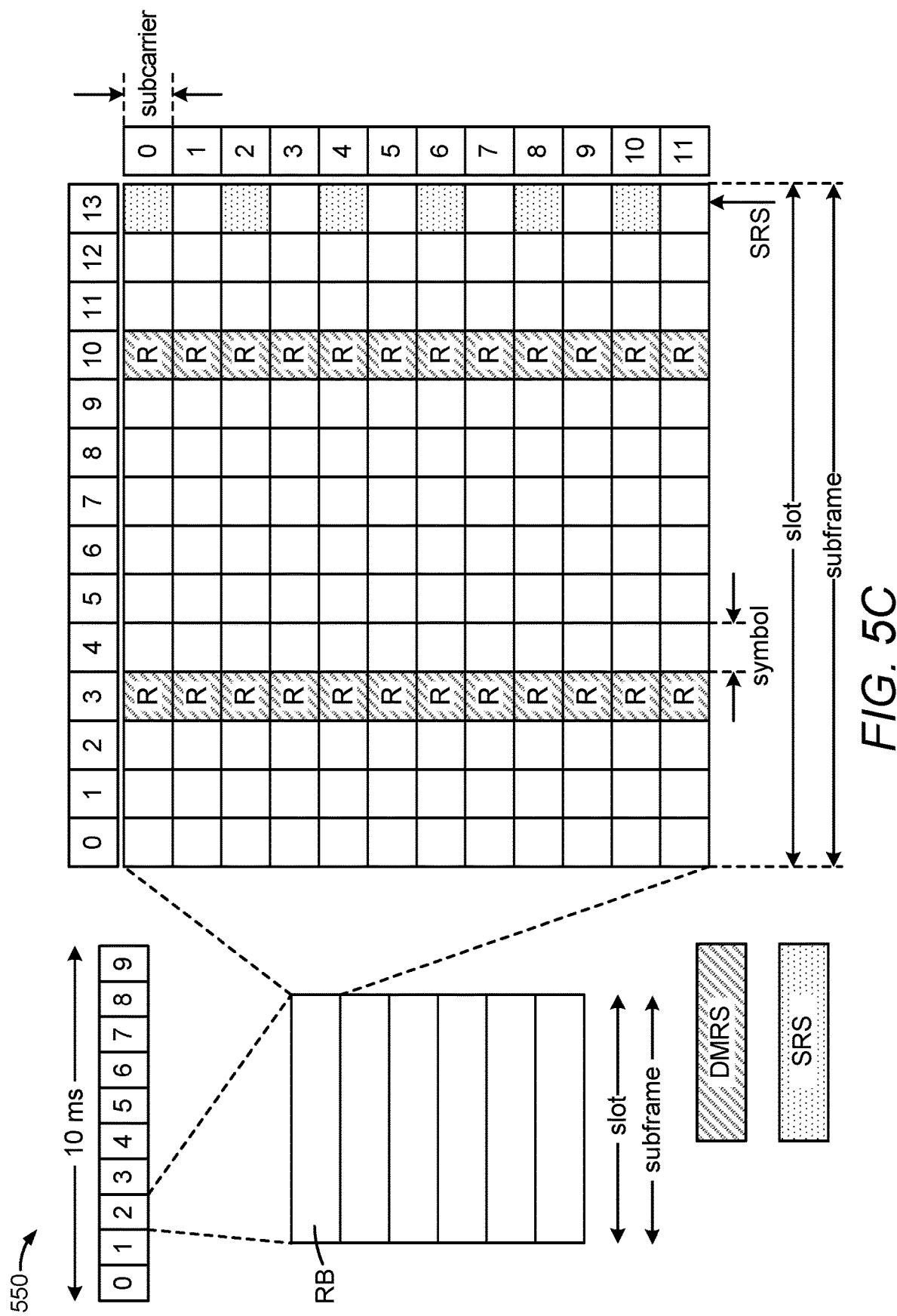
Figure 5D:
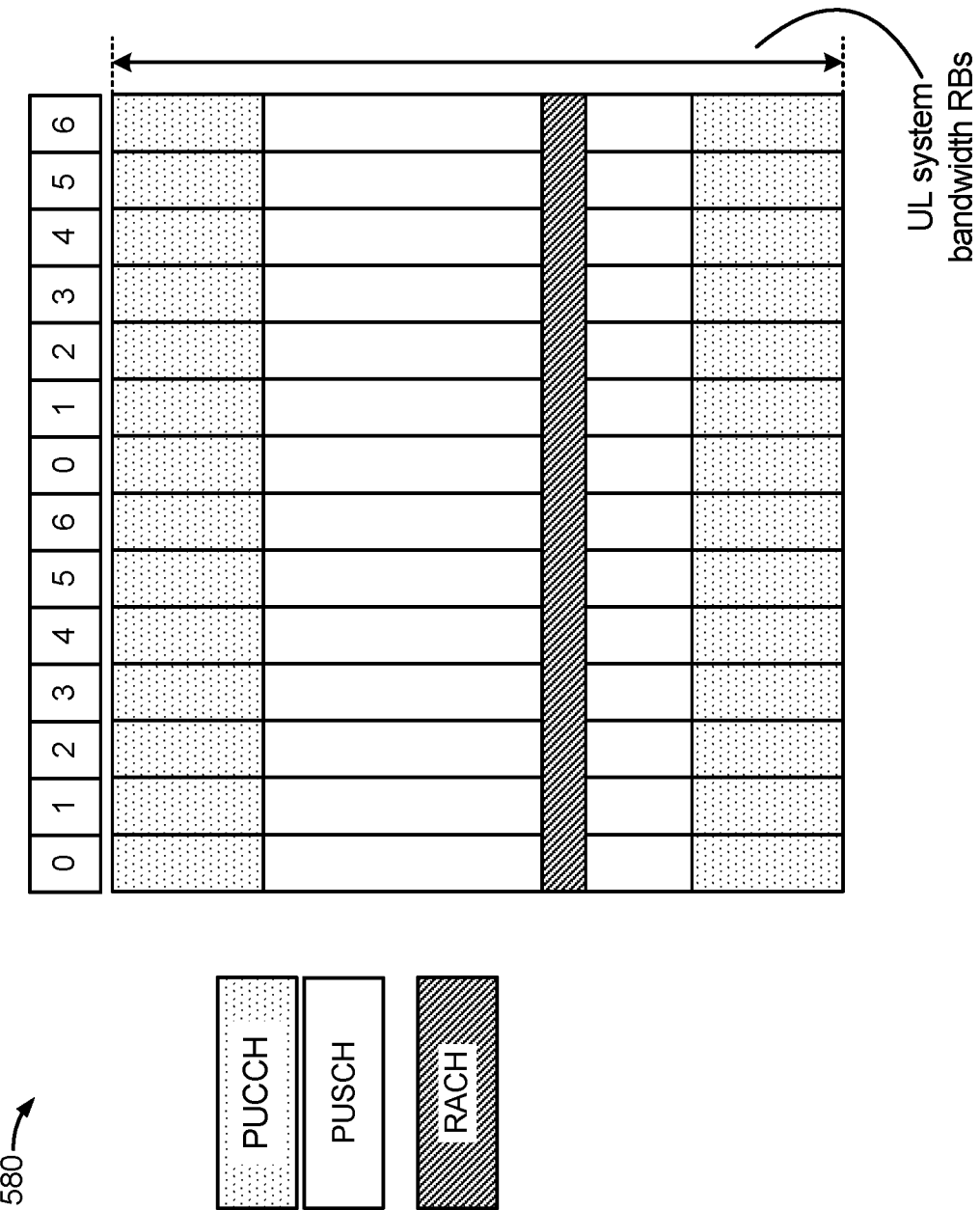

Various frame structures may be used to support downlink and uplink transmissions between network nodes (e.g., base stations and UEs). FIG. 5A is a diagram 500 illustrating an example of a downlink frame structure, according to aspects of the disclosure. FIG. 5B is a diagram 530 illustrating an example of channels within the downlink frame structure, according to aspects of the disclosure. FIG. 5C is a diagram 550 illustrating an example of an uplink frame structure, according to aspects of the disclosure. FIG. 5D is a diagram 580 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 5A to 5D, a numerology of 15 kHz is used. Thus, in the time domain, a 10 ms frame is divided into 10 equally sized subframes of 1 ms each, and each subframe includes one time slot. In FIGS. 5A to 5D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 5A to 5D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), etc. FIG. 5A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 5A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 5B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

The following are the currently supported DCI formats. Format 0-0: fallback for scheduling of PUSCH; Format 0-1: non-fallback for scheduling of PUSCH; Format 1-0: fallback for scheduling of PDSCH; Format 1-1: non-fallback for scheduling of PDSCH; Format 2-0: notifying a group of UEs of the slot format; Format 2-1: notifying a group of UEs of the PRB(s) and OFDM symbol(s) where the UEs may assume no transmissions are intended for the UEs; Format 2-2: transmission of TPC commands for PUCCH and PUSCH; and Format 2-3: transmission of a group of SRS requests and TPC commands for SRS transmissions. Note that a fallback format is a default scheduling option that has non-configurable fields and supports basic NR operations. In contrast, a non-fallback format is flexible to accommodate NR features.

As will be appreciated, a UE needs to be able to demodulate (also referred to as "decode") the PDCCH in order to read the DCI, and thereby to obtain the scheduling of resources allocated to the UE on the PDSCH and PUSCH. If the UE fails to demodulate the PDCCH, then the UE will not know the locations of the PDSCH resources and it will keep attempting to demodulate the PDCCH using a different set of PDCCH candidates in subsequent PDCCH monitoring occasions. If the UE fails to demodulate the PDCCH after some number of attempts, the UE declares a radio link failure (RLF). To overcome PDCCH demodulation issues, search spaces are configured for efficient PDCCH detection and demodulation.

Generally, a UE does not attempt to demodulate each and very PDCCH candidate that may be scheduled in a slot. To reduce restrictions on the PDCCH scheduler, and at the same time to reduce the number of blind demodulation attempts by the UE, search spaces are configured. Search spaces are indicated by a set of contiguous CCEs that the UE is supposed to monitor for scheduling assignments/grants relating to a certain component carrier. There are two types of search spaces used for the PDCCH to control each component carrier, a common search space (CSS) and a UE-specific search space (USS).

A common search space is shared across all UEs, and a UE-specific search space is used per UE (i.e., a UE-specific search space is specific to a specific UE). For a common search space, a DCI cyclic redundancy check (CRC) is scrambled with a system information radio network temporary identifier (SI-RNTI), random access RNTI (RA-RNTI), temporary cell RNTI (TC-RNTI), paging RNTI (P-RNTI), interruption RNTI (INT-RNTI), slot format indication RNTI (SFI-RNTI), TPC-PUCCH-RNTI, TPC-PUSCH-RNTI, TPC-SRS-RNTI, cell RNTI (C-RNTI), or configured scheduling RNTI (CS-RNTI) for all common procedures. For a UE-specific search space, a DCI CRC is scrambled with a C-RNTI or CS-RNTI, as these are specifically targeted to individual UE.

A UE demodulates the PDCCH using the four UE-specific search space aggregation levels (1, 2, 4, and 8) and the two common search space aggregation levels (4 and 8). Specifically, for the UE-specific search spaces, aggregation level '1' has six PDCCH candidates per slot and a size of six CCEs. Aggregation level '2' has six PDCCH candidates per slot and a size of 12 CCEs. Aggregation level '4' has two PDCCH candidates per slot and a size of eight CCEs. Aggregation level '8' has two PDCCH candidates per slot and a size of 16 CCEs. For the common search spaces, aggregation level '4' has four PDCCH candidates per slot and a size of 16 CCEs. Aggregation level '8' has two PDCCH candidates per slot and a size of 16 CCEs.

Each search space comprises a group of consecutive CCEs that could be allocated to a PDCCH, referred to as a PDCCH candidate. A UE demodulates all of the PDCCH candidates in these two search spaces (USS and CSS) to discover the DCI for that UE. For example, the UE may demodulate the DCI to obtain the scheduled uplink grant information on the PUSCH and the downlink resources on the PDSCH. Note that the aggregation level is the number of REs of a CORESET that carry a PDCCH DCI message, and is expressed in terms of CCEs. There is a one-to-one mapping between the aggregation level and the number of CCEs per aggregation level. That is, for aggregation level '4,' there are four CCEs. Thus, as shown above, if the aggregation level is '4' and the number of PDCCH candidates in a slot is '2,' then the size of the search space is '8' (i.e., 4×2=8).

As illustrated in FIG. 5C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 5C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 5D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some cases, a UE can use the DMRS of a PDCCH and/or PDSCH to derive positioning measurements (e.g., ToA, RSTD, Rx-Tx time difference, etc.). That is, the UE can use the DMRS of a PDCCH and/or PDSCH as PRS. In these cases, the UE needs an advance indication for which PDCCH and/or PDSCH is to be used as PRS. An indication is needed in advance because PRS processing may include steps not needed for regular processing, such as time-domain channel estimation or noise-tap-cleaning, determination of the first arriving path, AoA or AoD estimation, etc.

There are various techniques to reduce the number of indications used to indicate to a UE whether and which PDCCH and/or PDSCH are to be used as PRS. For example, the serving base station could use RRC, MAC control element (MAC-CE), and/or DCI signaling to activate or deactivate a mode in which all PDCCH and/or PDSCH are treated as PRS. As another example, the PDCCH and/or PDSCH that are treated as PRS may be restricted to certain slots.

There are also various techniques to increase the number of indications used to indicate to a UE whether and which PDCCH and/or PDSCH are to be used as PRS. For example, the DCI scheduling a PDSCH could include a "use as PRS" indication. For a multi-layer PDSCH, the "use as PRS" indication may be per-positioning frequency layer, which may be beneficial where different frequency layers have different spatial QCL. In addition, the presence of a "use as PRS" indication may be RRC-configurable, and may be limited to non-fallback DCI.

Because the location of a UE is calculated relative to the known locations of the TRPs transmitting the PRS the UE measures, PRS (and other downlink signals used as PRS) need to be associated with specific TRPs. However, in a multi-TRP scenario, the UE may not know from which of the multiple TRPs it is receiving a particular PRS. In a multi-TRP scenario, two or more TRPs provide joint scheduling, transmission, and reception for a UE. Multi-TRP operation is defined, from the UE's perspective, in a given serving cell (or component carrier). As such, the different TRPs may share the same PCI, and therefore, the PCI does not differentiate between the TRPs. Thus, there needs to be a way for the UE to differentiate between TRPs in a multi-TRP scenario.

Two modes for multi-TRP operation have been defined: single-DCI and multi-DCI. Single-DCI-based multi-TRP operation is applicable to cases where there is an ideal backhaul between the involved TRPs. An ideal backhaul requires highly detailed feedback (e.g., CSI) and close coordination between the involved TRPs. Single-DCI may employ different PDSCH schemes for robustness, such as spatial domain multiplexing (SDM), frequency division multiplexing (FDM), and/or time division multiplexing (TDM).

Multi-DCI-based multi-TRP operation is applicable to both ideal and non-ideal backhaul cases. In the case of a non-ideal backhaul, joint scheduling among the involved TRPs may not be feasible due to delay of the coordination of control signals and/or data packets among the different TRPs. Alternatively, or additionally, there may be limited backhaul capacity between the TRPs, resulting in a poor link adaptation (or performance loss). In multi-DCI-based multi-TRP operation, a carrier aggregation framework can be leveraged to treat different TRPs as different virtual component carriers from the perspective of the UE's capabilities.

Figure 6A:
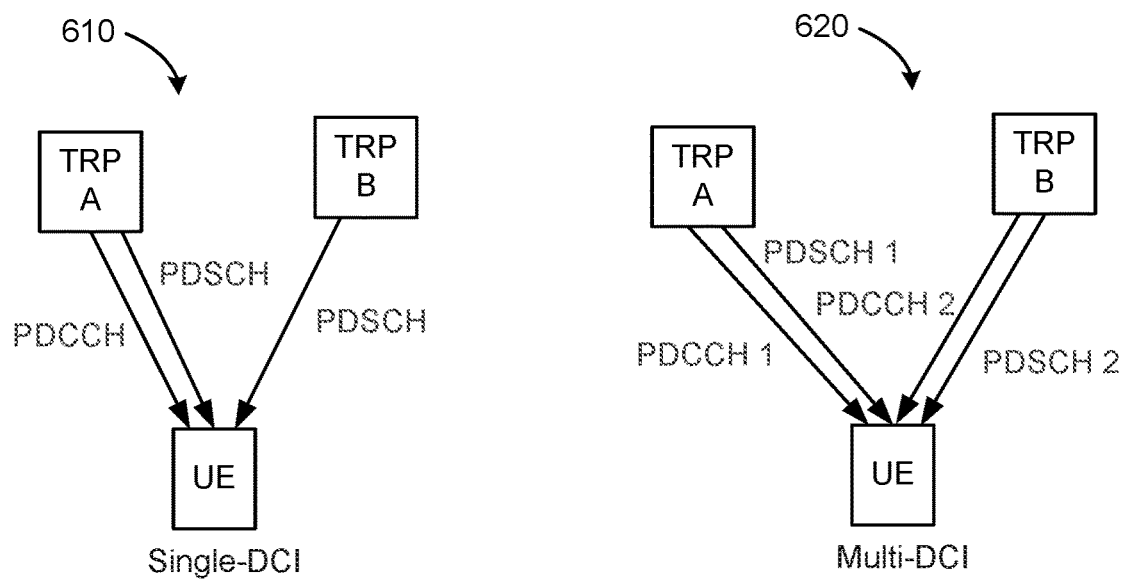
FIG. 6A illustrates a single-downlink control information (DCI)-based multi-transmission-reception point (TRP) architecture and a multi-DCI-based multi-TRP architecture, according to aspects of the disclosure.

FIG. 6A illustrates a single-DCI-based multi-TRP architecture 610 and a multi-DCI-based multi-TRP architecture 620, according to aspects of the disclosure. As shown in FIG. 6A, a UE is in communication with two TRPs, labeled "TRP A" and "TRP B." In the single-DCI-based multi-TRP architecture 610, the UE receives the PDCCH (which carries DCI) from only one TRP ("TRP A"), but a PDSCH from both TRPs ("TRP A" and "TRP B"). In contrast, in the multi-DCI-based multi-TRP architecture 620, the UE receives a PDCCH and a PDSCH from both TRPs. More specifically, DCI transmitted by the first TRP ("TRP A") in a first PDCCH (labeled "PDCCH 1") schedules a first PDSCH (labeled "PDSCH 1"), and DCI transmitted by the second TRP ("TRP B") in a second PDCCH (labeled "PDCCH 2") schedules a second PDSCH (labeled "PDSCH 2").

Figure 6B:
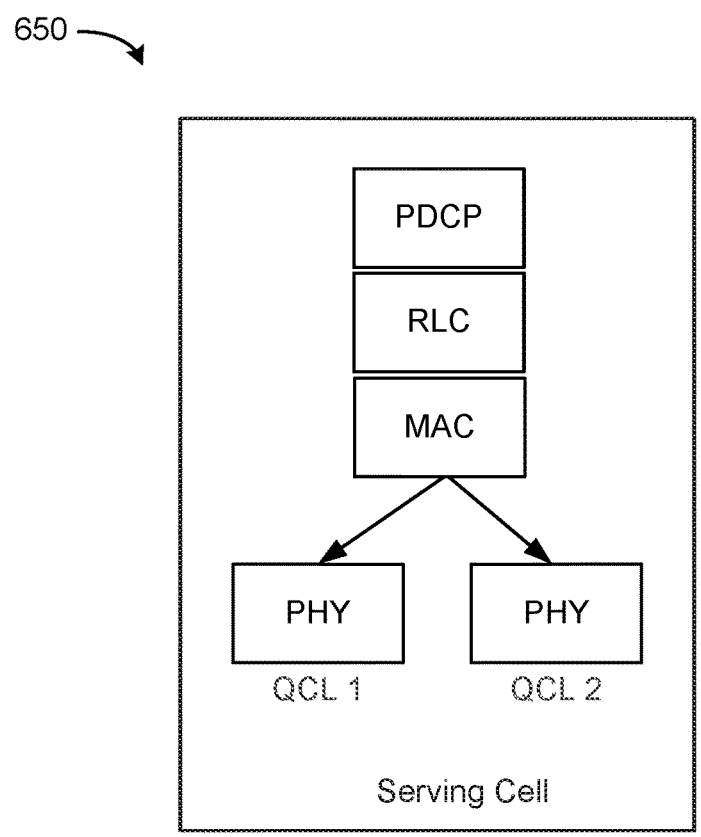
FIG. 6B illustrates a portion of the protocol stack in a multi-TRP scenario from the perspective of a UE, according to aspects of the disclosure.

FIG. 6B illustrates a portion of the protocol stack 650 in a multi-TRP scenario from the perspective of the UE, according to aspects of the disclosure. As shown in FIG. 6B, the multiple TRPs form a single serving cell (i.e., component carrier) for a UE. The UE perceives the multiple TRPs as having a single PDCP layer (e.g., PDCP layer 415), RLC layer (e.g., RLC layer 420), and MAC layer (e.g., MAC layer 425), but separate physical layers (e.g., PHY layer 430). The separate physical layers may have separate QCL sources (labeled "QCL 1" and "QCL 2"). The UE may treat the different physical layers (i.e., the physical transmissions from the different TRPs) as different component carriers and use carrier aggregation to combine them, as described above with reference to FIG. 1.

Figure 7:
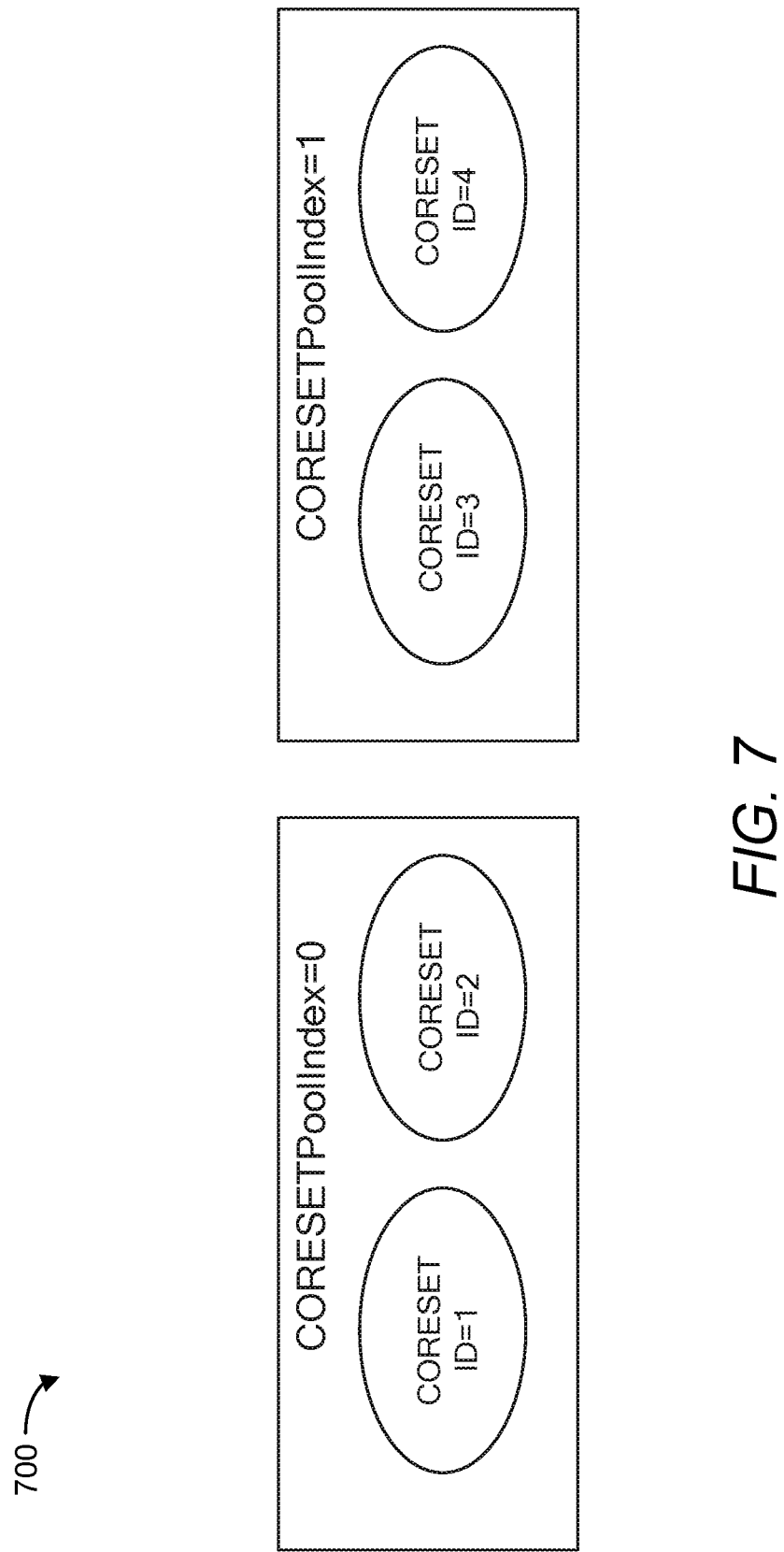
FIG. 7 is a diagram of an example grouping of control resource sets (CORESETs) based on the parameter "CORESETPoolIndex," according to aspects of the disclosure.

With specific reference to multi-DCI-based multi-TRP transmission, TRP differentiation at the UE side is based on the parameter "CORESETPoolIndex." Each CORESET (there are currently a maximum of five CORESETs) can be configured with a value of "CORESETPoolIndex." The value of "CORESETPoolIndex" can be '0' or '1,' which groups the five possible CORESETs into two groups. This is illustrated in FIG. 7. Specifically, FIG. 7 is a diagram 700 of an example grouping of CORESETs based on the parameter "CORESETPoolIndex," according to aspects of the disclosure. As shown in FIG. 7, CORESETs with identifiers '1' and '2' are grouped together by "CORESETPoolIndex" '0,' and CORESETs with identifiers '3' and '4' are grouped together by "CORESETPoolIndex" '1.'

If a UE is configured by the higher layer parameter "PDCCH-Config" that contains two different values of "CORESETPoolIndex" in the CORESETs for the active BWP of a serving cell, it means that the UE is configured for multi-DCI-based multi-TRP operation. Other than this "CORESETPoolIndex" differentiation between TRPs, the fact that there are different TRPs is transparent to the UE. The "CORESETPoolIndex" of the CORESET in which a DCI is received may be used for different purposes, such as HARQ-ACK codebook construction and transmission, PDSCH scrambling, rate matching, etc.

For single-DCI-based multi-TRP operation, there are various transmission configuration indicator (TCI) state enhancements. TCI states are dynamically sent to a UE in DCI that includes configurations for QCL-relationships between the downlink reference signals in one CSI-RS set and the PDSCH DMRS ports. A UE can be configured with a list of TCI state configurations within the higher layer (RRC) parameter "PDSCH-Config" to decode the PDSCH according to a detected PDCCH with DCI intended for the UE and the given serving cell. Each TCI state contains parameters for configuring a QCL relationship between one or two downlink reference signals and the DMRS ports of the PDSCH, the DMRS port of the PDCCH, or the CSI-RS port(s) of a CSI-RS resource. The QCL relationship is configured by the higher layer (RRC) parameter "qcl-Type1" for the first downlink reference signal, and "qcl-Type2" for the second downlink reference signal, where a maximum of two QCL types per TCI state can be configured.

The TCI field in the DCI can point to one or two TCI states. There are MAC-CE enhancements for mapping active TCI states to TCI codepoints. Specifically, a MAC-CE can activate TCI states and map one or two TCI states to a TCI codepoint. Thus, a TCI codepoint represents one or more TCI states. The number of bits for a TCI field in DCI may be a maximum of three bits. This is used for all SDM, FDM, and/or TDM schemes.

Figure 8:
FIGS. 8 and 9 illustrate various medium access control control elements (MAC-CEs) for use with aspects of the disclosure.

FIG. 8 illustrates an example TCI states activation/deactivation for UE-specific PDSCH MAC-CE 800, according to aspects of the disclosure. The MAC-CE 800 is identified by a MAC subheader with a logical channel identifier (LCID). It has a variable size consisting of the following fields: Serving Cell ID, BWP ID, $T_i$, and CORESET Pool ID.

The Serving Cell ID field indicates the identity of the serving cell for which the MAC-CE 800 applies. The length of the field is five bits. If the indicated serving cell is configured as part of a component carrier list, the MAC-CE 800 applies to all the component carriers in the component carrier list.

The BWP ID field indicates a downlink BWP for which the MAC-CE 800 applies as the codepoint of the DCI bandwidth part indicator field. The length of the BWP ID field is two bits. This field is ignored if the MAC-CE 800 applies to a component carrier list.

If there is a TCI state with "TCI-StateId" i, a $T_i$ field indicates the activation/deactivation status of the TCI state with "TCI-StateId" i. Otherwise the MAC entity ignores the $T_i$ field. The $T_i$ field is set to '1' to indicate that the TCI state with "TCI-StateId" i is to be activated and mapped to the codepoint of the DCI transmission configuration indication field. The $T_i$ field is set to '0' to indicate that the TCI state with "TCI-StateId" i is to be deactivated and is not mapped to the codepoint of the DCI transmission configuration indication field. The codepoint to which the TCI State is mapped is determined by its ordinal position among all the TCI States with $T_i$ field set to '1,' i.e., the first TCI state with $T_i$ field set to '1' is to be mapped to the codepoint value '0,' the second TCI state with $T_i$ field set to '1' is to be mapped to the codepoint value '1,' and so on. Currently, the maximum number of activated TCI states is eight.

The CORESET Pool ID field indicates that mapping between the activated TCI states and the codepoint of the DCI transmission configuration indication set by field $T_i$ is specific to the "ControlResourceSetId" configured with CORESET Pool ID. This field is set to '1' to indicate that the MAC-CE 800 is to be applied for the downlink transmission scheduled by a CORESET with the CORESET pool ID equal to '1.' Otherwise, the MAC-CE 800 is to be applied for the downlink transmission scheduled by the CORESET pool ID equal to '0.'

Figure 9:

FIG. 9 illustrates an example TCI state indication for a UE-specific PDCCH MAC-CE 900. The MAC-CE 900 is identified by a MAC subheader with LCD. It has a fixed size of 16 bits with the following fields: Serving Cell ID, CORESET ID, and TCI State ID.

The Serving Cell ID field indicates the identity of the serving cell for which the MAC-CE 900 applies. The length of the field is five bits. If the indicated serving cell is configured as part of a component carrier list, the MAC-CE 900 applies to all the component carriers in the component carrier list.

The CORESET ID field indicates a CORESET identified with "ControlResourceSetId," for which the TCI State is being indicated. In case the value of the field is '0,' the field refers to the CORESET configured by "controlResourceSetZero." The length of the field is four bits.

The TCI State ID field indicates the TCI state identified by "TCI-StateId" applicable to the CORESET identified by the CORESET ID field. If the field of CORESET ID is set to '0,' this field indicates a "TCI-StateId" for a TCI state of the first 64 TCI-states configured by "tci-States-ToAddModList" and "tci-States-ToReleaseList" in the "PDSCH-Config" in the active BWP. If the field of CORESET ID is set to a value other than '0,' this field indicates a "TCI-StateId" configured by "tci-StatesPDCCH-ToAddList" and "tci-StatesPDCCH-ToReleaseList" in the "controlResourceSet" identified by the indicated CORESET ID. The length of the field is seven bits.

The present disclosure provides techniques for associating PRS (and other downlink signals used as PRS) with specific TRPs in a multi-TRP scenario. For single-DCI multi-TRP operation (with transparent PCIs to the UE), TCI state IDs and/or TCI-codepoints can be used to identify specific TRPs.

First, a UE can be configured with multiple TCI codepoints, each one containing a TCI state for a different CORESET Pool ID (see, e.g., TCI states activation/deactivation for UE-specific PDSCH MAC-CE 800). For example, a "TCI-Codepoint-0" could be assigned values of {"TCI-0" for CORESET Pool ID=0, "TCI-1" for CORESET Pool ID=1, "TCI-2" for CORESET Pool ID=2, . . . }, and a "TCI-Codepoint-1" could be assigned values of {"TCI-3" for CORESET Pool ID=0, "TCI-4" for CORESET Pool ID=1, "TCI-5" for CORESET Pool ID=2, . . . }. As will be appreciated, the parameters "TCI-i" represent different TCI states. Note that while three CORESET Pool IDs are shown in the foregoing example, there may be only two TRPs or more than three TRPs involved in the multi-TRP operation, and as such, there may be more or fewer than three CORESET Pool IDs.

Second, the UE is indicated that a specific DCI and/or a scheduled PDSCH can be used to derive positioning measurements (e.g., ToA, RSRP, RSTD, Rx-Tx time difference, etc.). This is because, as described above, a TCI state can be associated with a PDCCH (which carries DCI) or a PDSCH.

Third, the UE derives positioning measurements from the indicated DCI and/or PDSCH and reports the measurements to the positioning entity (e.g., location server, 230, LMF 270, SLP 272, serving base station, positioning engine at the UE, etc.) via UCI, MAC-CE, RRC, or LPP, as appropriate. The UE also reports an association of each measurement to a TCI state identifier (e.g., "TCI-1," "TCI-2," etc.) inside one of the configured TCI codepoints (e.g., "TCI-Codepoint-0" and "TCI-Codepoint-1") and a timestamp of the DCI and/or PDSCH that was used for the measurement. Note that the timestamp is a timestamp of when the measurement was performed effectively, or the slot in which the UE received the corresponding DCI. The timestamp is needed because the TCI states may change over time.

Fourth, if the UE sends the positioning report to the serving base station, the serving base station can determine from which TRP the UE received the DCI and/or PDSCH based on the TCI state identifier and the timestamp of the DCI and/or PDSCH that was measured. The serving base station can then determine the actual PCIs for the TRPs and attach them to the measurements before forwarding the positioning report to the location server (or other positioning entity). If, however, the positioning report is sent directly to the location server (e.g., via LPP), the serving base station needs to send the location server an association of TCI state identifiers and/or TCI-codepoints configured to the UE and timestamps for the DCI and/or PDSCH to enable the location server to perform the conversion and determine the PCIs of the involved TRPs.

Fifth, once the TRPs have been identified, their physical locations can be used to estimate the location of the UE based on the UE's measurements of the DCI and/or PDSCH.

For multi-DCI multi-TRP (with transparent PCIs to the UE), a "CORESETPoolIndex" can be used to identify a specific TRP. First, a UE can be configured with multiple "CORESETPoolIndex" values for the CORESETs for the active BWP of a serving cell.

Second, the UE is indicated that a specific "CORESETPoolIndex," PDCCH, and/or scheduled PDSCH can be used to derive positioning measurements (e.g., ToA, RSRP, RSTD, Rx-Tx time difference, etc.). The UE derives measurements using the CORESETs that are associated with the "CORESETPoolIndex" or with the PDSCHs that are scheduled by the CORESETs that are associated with the "CORESETPoolIndex."

Third, the UE derives positioning measurements of the PDCCH and/or PDSCH and reports them to the positioning entity (e.g., location server, 230, LMF 270, SLP 272, serving base station, positioning engine at the UE, etc.) via UCI, MAC-CE, RRC, LPP, as appropriate. The UE also reports an association between each measurement and a "CORESETPoolIndex," as well as a timestamp of the PDCCH and/or PDSCH that was used for the measurement.

Fourth, if the positioning report is sent to the serving base station, the serving base station can determine from which TRP the UE received the PDCCH and/or PDSCH based on the "CORESETPoolIndex" and the timestamp of the PDCCH and/or PDSCH that was measured. The serving base station can then determine the actual PCIs for the TRPs and attach them to the measurements before forwarding the positioning report to the location server (or other positioning entity). However, if the UE sends the positioning report to the location server, the serving base station needs to send the location server an association of the "CORESETPoolIndex" configured to the UE and timestamps for the PDCCH and/or PDSCH to enable the location server to perform the conversion and determine the PCIs of the involved TRPs.

Fifth, once the TRPs have been identified, their physical locations can be used to estimate the location of the UE based on the UE's measurements of the PDCCH and/or PDSCH.

For multi-TRP scenarios where the PCIs of the involved TRPs are transparent to the UE, as in the scenarios described above, a UE can be configured with a mapping of TRS, SSB(s), TCI state(s), TCI codepoint(s), or CORESETPoolID(s) to TRP-ID. In that way, when the UE performs a measurement, it can report the measurement to the positioning entity using an identifier of the TRP that transmitted the PDCCH and/or PDSCH (e.g., PRS ID, PCI, CGI, ARFCN) and not the locally defined SSB(s), TCI state(s), TCI codepoint(s), CORESETPoolID(s), and/or TRS.

Figure 10:
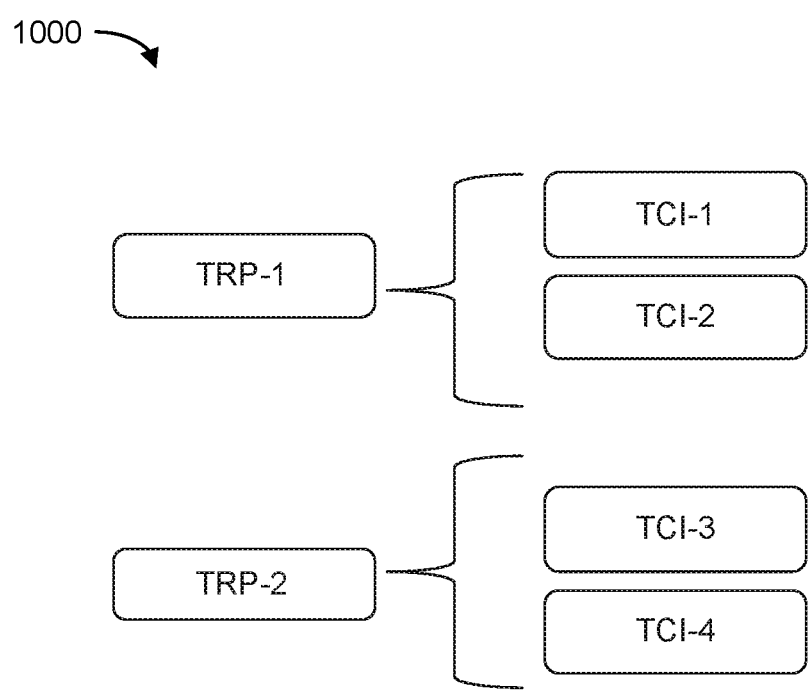
FIG. 10 is a diagram showing how multiple transmission configuration indicator (TCI) state identifiers may map to a single TRP, according to aspects of the disclosure.

FIG. 10 is a diagram 1000 showing how multiple TCI state identifiers may map to a single TRP, according to aspects of the disclosure. As shown in FIG. 10, a first TRP (labeled "TRP-1") maps to two TCI states (labeled "TCI-1" and "TCI-2"), and a second TRP (labeled "TRP-2") also maps to two TCI states (labeled "TCI-3" and "TCI-4"). Because the two TRPs map to different TCI states, even though they both map to multiple TCI states, they can be uniquely identified by their TCI states. For example, if a UE is configured with TCI states "TCI-1" and "TCI-3," it can map those TCI states to the first and second TRPs, respectively.

An SSB may also be used to identify a TRP. In NR, the SSBs of neighboring cells with PCI information can be provided to the UE for the purpose of power control and spatial relation information derivation for SRS. When the UE receives a PDCCH and/or PDSCH with a specific association to one or more TRS, these TRS are associated with an SSB, which is in turn associated with a PCI. Therefore, the UE could determine the PCI of the TRP transmitting the TRS for the PDCCH and/or PDSCH from the SSB associated with the TRS. The UE can then report positioning measurements associated with PCIs directly to the positioning server. FIG. 11 is a diagram 1100 illustrating various SSB IEs that can be used to determine the PCI.

As another technique to identify a TRP in a multi-TRP scenario, the DMRS associated with a semi-persistent PDSCH can be reused for positioning purposes. Unlike the dynamic PDSCH discussed above, which is configured through DCI, semi-persistent PDSCH is configured via RRC. In an aspect, a UE can reuse one or more of the active semi-persistent PDSCH for positioning purposes, or more specifically, the DMRS associated with the semi-persistent PDSCH. An additional parameter in the RRC configuration for the semi-persistent PDSCH can inform the UE to use the associated DMRS for positioning. The DMRS would be associated with a TRS, TCI-state, or PCI directly or indirectly, as described above. In that way, the UE would be able to identify the TRP based on the DMRS.

Figure 12:
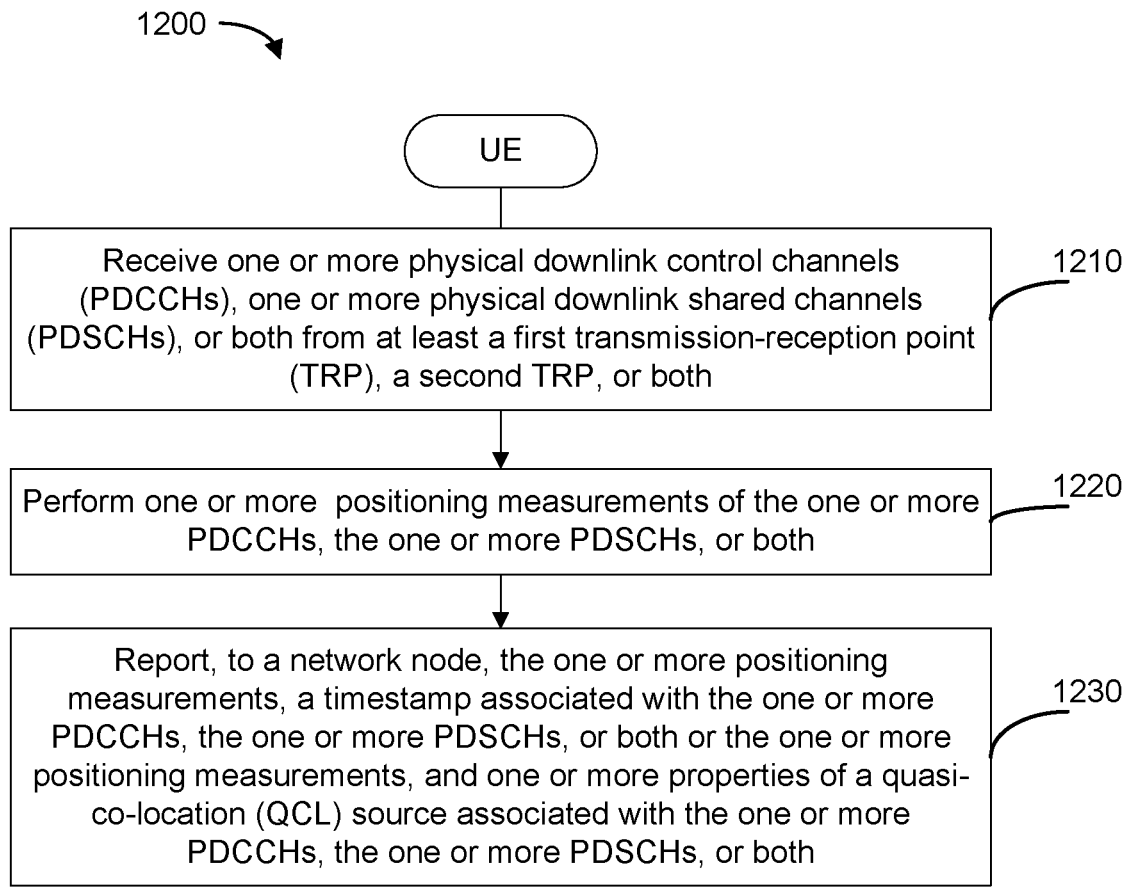
FIGS. 12 to 14 illustrate example methods of wireless communication, according to aspects of the disclosure.

FIG. 12 illustrates an example method 1200 of wireless communication, according to aspects of the disclosure. In an aspect, the method 1200 may be performed by a UE (e.g., any of the UEs described herein).

At 1210, the UE receives one or more PDCCHs, one or more PDSCHs, or both from at least a first TRP, a second TRP, or both (e.g., any two or more TRPs described herein). In an aspect, operation 1210 may be performed by the one or more WWAN transceivers 310, the one or more processors 332, memory 340, and/or positioning component 342, any or all of which may be considered means for performing this operation.

At 1220, the UE performs one or more positioning measurements (e.g., ToA, RSTD, RSRP, etc.) of the one or more PDCCHs, the one or more PDSCHs, or both. In an aspect, operation 1220 may be performed by the one or more WWAN transceivers 310, the one or more processors 332, memory 340, and/or positioning component 342, any or all of which may be considered means for performing this operation.

At 1230, the UE reports, to a network node (e.g., the serving base station or a location server), the one or more positioning measurements, a timestamp associated with the one or more PDCCHs, the one or more PDSCHs, or both or the one or more positioning measurements, and one or more properties of a QCL source (e.g., CSI-RS, DMRS, TRS, SSB) associated with the one or more PDCCHs, the one or more PDSCHs, or both (e.g., to enable a location server to determine which of the first TRP and the second TRP transmitted the one or more PDCCHs, the one or more PDSCHs, or both). In an aspect, operation 1230 may be performed by the one or more WWAN transceivers 310, the one or more processors 332, memory 340, and/or positioning component 342, any or all of which may be considered means for performing this operation.

Figure 13:
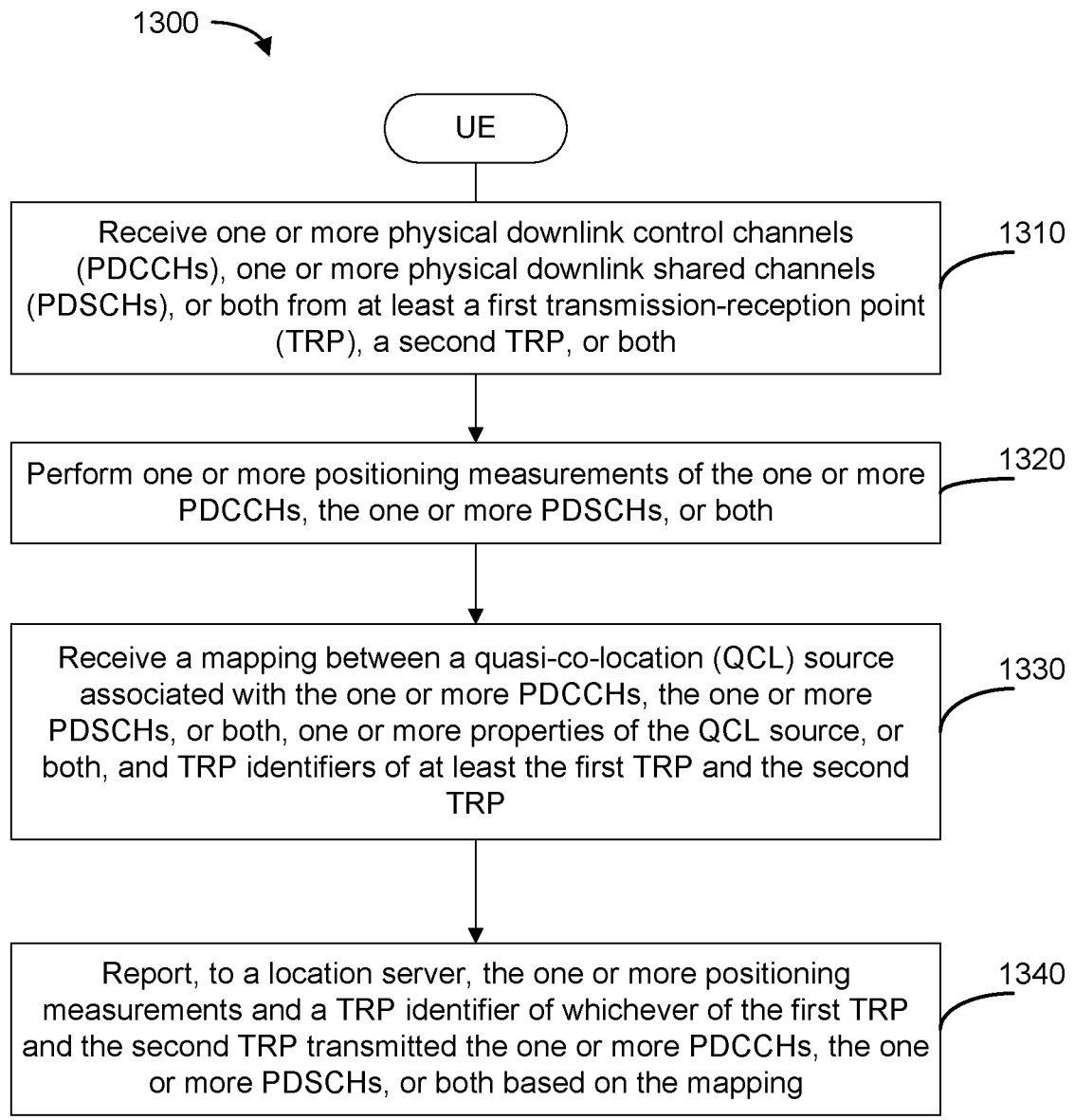

FIG. 13 illustrates an example method 1300 of wireless communication, according to aspects of the disclosure. In an aspect, the method 1300 may be performed by a UE (e.g., any of the UEs described herein).

At 1310, the UE receives one or more PDCCHs, one or more PDSCHs, or both from at least a first TRP, a second TRP, or both (e.g., any two TRPs described herein). In an aspect, operation 1310 may be performed by the one or more WWAN transceivers 310, the one or more processors 332, memory 340, and/or positioning component 342, any or all of which may be considered means for performing this operation.

At 1320, the UE performs one or more positioning measurements (e.g., ToA, RSTD, RSRP, etc.) of the one or more PDCCHs, the one or more PDSCHs, or both. In an aspect, operation 1320 may be performed by the one or more WWAN transceivers 310, the one or more processors 332, memory 340, and/or positioning component 342, any or all of which may be considered means for performing this operation.

At 1330, the UE receives a mapping between a QCL source (e.g., CSI-RS, DMRS, TRS, SSB) associated with the one or more PDCCHs, the one or more PDSCHs, or both, one or more properties of the QCL source, or both, and TRP identifiers of at least the first TRP and the second TRP. In an aspect, operation 1330 may be performed by the one or more WWAN transceivers 310, the one or more processors 332, memory 340, and/or positioning component 342, any or all of which may be considered means for performing this operation.

At 1340, the UE reports, to a location server, the one or more positioning measurements and a TRP identifier of whichever of the first TRP and the second TRP transmitted the one or more PDCCHs, the one or more PDSCHs, or both based on the mapping (e.g., to enable the location server to determine a location estimate of the UE). In an aspect, operation 1340 may be performed by the one or more WWAN transceivers 310, the one or more processors 332, memory 340, and/or positioning component 342, any or all of which may be considered means for performing this operation.

Figure 14:
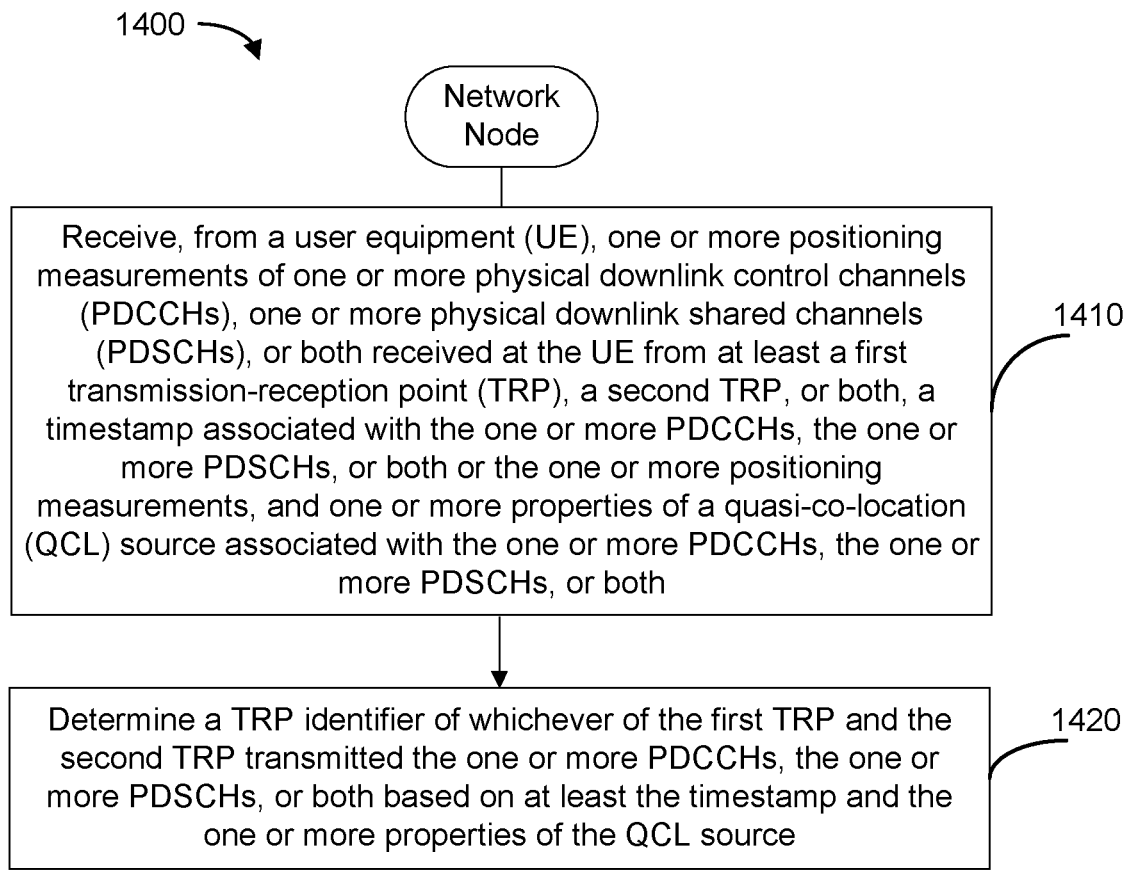

FIG. 14 illustrates an example method 1400 of wireless communication, according to aspects of the disclosure. In an aspect, the method 1400 may be performed by a network node (e.g., a serving base station or a location server).

At 1410, the network node receives, from a UE (e.g., any of the UEs described herein), one or more positioning measurements (e.g., ToA, RSTD, RSRP, etc.) of one or more PDCCHs, one or more PDSCHs, or both received at the UE from at least a first TRP, a second TRP, or both (e.g., any two TRPs described herein), a timestamp associated with the one or more PDCCHs, the one or more PDSCHs, or both or the one or more positioning measurements, and one or more properties of a QCL source (e.g., CSI-RS, DMRS, TRS, SSB) associated with the one or more PDCCHs, the one or more PDSCHs, or both. In an aspect, where the network node is a base station, operation 1410 may be performed by the one or more WWAN transceivers 350, the one or more processors 384, memory 386, and/or positioning component 388, any or all of which may be considered means for performing this operation. Where the network node is a location server, operation 1410 may be performed by the one or more network interfaces 390, the one or more processors 394, memory 396, and/or positioning component 398, any or all of which may be considered means for performing this operation.

At 1420, the network node determines a TRP identifier (e.g., PCI) of whichever of the first TRP and the second TRP transmitted the one or more PDCCHs, the one or more PDSCHs, or both based on at least the timestamp and the one or more properties of the QCL source. In an aspect, where the network node is a base station, operation 1420 may be performed by the one or more WWAN transceivers 350, the one or more processors 384, memory 386, and/or positioning component 388, any or all of which may be considered means for performing this operation. Where the network node is a location server, operation 1420 may be performed by the one or more network interfaces 390, the one or more processors 394, memory 396, and/or positioning component 398, any or all of which may be considered means for performing this operation.

As will be appreciated, a technical advantage of the method 1200 to 1400 is that the location server can determine which measurement of the PDCCH and/or the PDSCH is associated with each TRP/QCL, and thereby enable positioning methods that use multilateration.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving a physical downlink channel from at least a first transmission-reception point (TRP) or a second TRP; performing a positioning measurement of the physical downlink channel; and reporting, to a network node, the positioning measurement, a timestamp associated with the physical downlink channel or the positioning measurement, and one or more properties of a quasi-co-location (QCL) source associated with the physical downlink channel.

Clause 2. The method of clause 1, wherein the UE receives a single downlink control information (DCI) for both the first TRP and the second TRP.

Clause 3. The method of clause 2, wherein the one or more properties of the QCL source comprise at least one transmission configuration indicator (TCI) state associated with the physical downlink channel.

Clause 4. The method of clause 3, further comprising: receiving one or more TCI codepoints, each TCI codepoint including one or more TCI states, each TCI codepoint associated with one of the first TRP and the second TRP, wherein the at least one TCI state is one of the one or more TCI states of one of the one or more TCI codepoints.

Clause 5. The method of clause 4, wherein the UE receives the one or more TCI codepoints from a serving base station in medium access control control element (MAC-CE) signaling or radio resource control (RRC) signaling.

Clause 6. The method of clause 1, wherein the UE receives DCI from each of the first TRP and the second TRP.

Clause 7. The method of clause 6, wherein the one or more properties of the QCL source comprise a control resource set (CORESET) pool index associated with the physical downlink channel.

Clause 8. The method of clause 7, further comprising: receiving a plurality of CORESET pool indexes for a corresponding plurality of CORESETS for an active bandwidth part (BWP) for a serving cell used by the first TRP and the second TRP, wherein the CORESET pool index associated with the physical downlink channel is one of the plurality of CORESET pool indexes.

Clause 9. The method of clause 8, wherein the UE receives the plurality of CORESET pool indexes from a serving base station in medium access control control element (MAC-CE) signaling or radio resource control (RRC) signaling.

Clause 10. The method of any of clauses 1 to 9, wherein the physical downlink channel comprises a physical downlink control channel (PDCCH) or a physical downlink shared channel (PDSCH).

Clause 11. The method of any of clauses 1 to 10, wherein the QCL source comprises a channel state information reference signal (CSI-RS), a demodulation reference signal (DMRS), a tracking reference signal (TRS), or a synchronization signal block (SSB) transmitted by whichever of the first TRP and the second TRP transmitted the downlink physical channel.

Clause 12. The method of any of clauses 1 to 11, wherein the first TRP and the second TRP operate in a single serving cell for the UE.

Clause 13. The method of any of clauses 1 to 12, wherein the network node comprises a base station serving the UE or a location server.

Clause 14. The method of any of clauses 1 to 13, wherein the UE reports the positioning measurement, the timestamp, and the one or more properties to the network node to enable a location server to determine which of the first TRP and the second TRP transmitted the physical downlink channel.

Clause 15. A method of wireless communication performed by a user equipment (UE), comprising: receiving a physical downlink channel from at least a first transmission-reception point (TRP) or a second TRP; performing a positioning measurement of the physical downlink channel; receiving a mapping between a quasi-co-location (QCL) source associated with the physical downlink channel, one or more properties of the QCL source, or both, and TRP identifiers of at least the first TRP and the second TRP; determining a TRP identifier of whichever of the first TRP and the second TRP transmitted the downlink physical channel based on the mapping; and reporting, to a location server, the positioning measurement and the TRP identifier.

Clause 16. The method of clause 15, wherein: the one or more properties of the QCL source comprise at least one transmission configuration indicator (TCI) state, at least one TCI codepoint, a control resource set (CORESET) pool index, or any combination thereof, associated with the physical downlink channel, and the QCL source comprises a tracking reference signal (TRS), a synchronization signal block (SSB), a channel state information reference signal (CSI-RS), a demodulation reference signal (DMRS), or a synchronization signal block (SSB) transmitted by whichever of the first TRP and the second TRP transmitted the downlink physical channel.

Clause 17. The method of any of clauses 15 to 16, wherein the UE receives the mapping from a serving base station in medium access control control element (MAC-CE) signaling or radio resource control (RRC) signaling.

Clause 18. The method of any of clauses 15 to 17, wherein: the QCL source comprises a TRS associated with an SSB, and the determining comprises determining the TRP identifier from the SSB associated with the TRS.

Clause 19. The method of any of clauses 15 to 18, wherein the TRP identifier comprises a physical cell identifier (PCI).

Clause 20. The method of any of clauses 15 to 19, wherein the physical downlink channel comprises a physical downlink control channel (PDCCH) or a physical downlink shared channel (PDSCH).

Clause 21. The method of clause 20, wherein: the PDSCH is a semi-persistent PDSCH configured via RRC signaling from a serving base station, or the PDSCH is a dynamic PDSCH configured via DCI from the serving base station.

Clause 22. The method of any of clauses 15 to 21, wherein the first TRP and the second TRP operate in a single serving cell for the UE.

Clause 23. The method of any of clauses 15 to 22, wherein the UE reports the positioning measurement and the TRP identifier to the location server to enable the location server to determine a location estimate for the UE.

Clause 24. A method of wireless communication performed by a network node, comprising: receiving, from a user equipment (UE), a positioning measurement of a physical downlink channel received at the UE from at least a first transmission-reception point (TRP) or a second TRP, a timestamp associated with the physical downlink channel or the positioning measurement, and one or more properties of a quasi-co-location (QCL) source associated with the physical downlink channel; and determining a TRP identifier of whichever of the first TRP and the second TRP transmitted the physical downlink channel based on at least the timestamp and the one or more properties of the QCL source.

Clause 25. The method of clause 24, wherein the network node is a serving base station for the UE.

Clause 26. The method of clause 25, wherein the positioning measurement, the timestamp, and the one or more properties of the QCL source are received from the UE.

Clause 27. The method of any of clauses 25 to 26, wherein the one or more properties of the QCL source comprise at least one transmission configuration indicator (TCI) state associated with the physical downlink channel.

Clause 28. The method of clause 27, further comprising: transmitting, to the UE, one or more TCI codepoints, each TCI codepoint including one or more TCI states, each TCI codepoint associated with one of the first TRP and the second TRP, wherein the at least one TCI state is one of the one or more TCI states of one of the one or more TCI codepoints.

Clause 29. The method of any of clauses 25 to 28, wherein the one or more properties of the QCL source comprise a control resource set (CORESET) pool index associated with the physical downlink channel.

Clause 30. The method of clause 29, further comprising: transmitting, to the UE, a plurality of CORESET pool indexes for a corresponding plurality of CORESETS for an active bandwidth part (BWP) for a serving cell used by the first TRP and the second TRP, wherein the CORESET pool index associated with the physical downlink channel is one of the plurality of CORESET pool indexes.

Clause 31. The method of any of clauses 25 to 30, further comprising: transmitting the positioning measurement and the TRP identifier to a location server to enable the location server to calculate an estimate of a location of the UE.

Clause 32. The method of any of clauses 25 to 31, further comprising: calculating an estimate of a location of the UE based on at least the positioning measurement and the TRP identifier.

Clause 33. The method of clause 24, wherein the network node is a location server.

Clause 34. The method of clause 33, wherein the one or more properties of the QCL source comprise at least one transmission configuration indicator (TCI) state associated with the physical downlink channel.

Clause 35. The method of clause 34, further comprising: receiving, from a serving base station for the UE, an association between the UE and one or more TCI codepoints, each TCI codepoint including one or more TCI states, each TCI codepoint associated with one of the first TRP and the second TRP, wherein the at least one TCI state is one of the one or more TCI states of one of the one or more TCI codepoints; and receiving, from the serving base station, timestamps indicating times during which the one or more TCI codepoints were associated with the first TRP or the second TRP.

Clause 36. The method of clause 35, wherein determining the TRP identifier is further based on the association and the timestamps received from the serving base station.

Clause 37. The method of any of clauses 33 to 36, wherein the one or more properties of the QCL source comprise a control resource set (CORESET) pool index associated with the physical downlink channel.

Clause 38. The method of clause 37, further comprising: receiving, from a serving base station for the UE, an association between the UE and a plurality of CORESET pool indexes for a corresponding plurality of CORESETS for an active bandwidth part (BWP) for a serving cell used by the first TRP and the second TRP, wherein the CORESET pool index associated with the physical downlink channel is one of the plurality of CORESET pool indexes; and receiving, from the serving base station, timestamps indicating times during which the plurality of CORESET pool indexes were associated with the first TRP or the second TRP.

Clause 39. The method of clause 38, wherein determining the TRP identifier is further based on the association and the timestamps received from the serving base station.

Clause 40. The method of any of clauses 33 to 39, further comprising: calculating an estimate of a location of the UE based on at least the positioning measurement and the TRP identifier.

Clause 41. The method of any of clauses 24 to 40, wherein the physical downlink channel comprises a physical downlink control channel (PDCCH) or a physical downlink shared channel (PDSCH).

Clause 42. The method of any of clauses 24 to 41, wherein the QCL source comprises a channel state information reference signal (CSI-RS), a demodulation reference signal (DMRS), a tracking reference signal (TRS), or a synchronization signal block (SSB) transmitted by whichever of the first TRP and the second TRP transmitted the downlink physical channel.

Clause 43. An apparatus comprising a memory, at least one transceiver, and at least one processor communicatively coupled to the memory and the at least one transceiver, the memory, the at least one transceiver, and the at least one processor configured to perform a method according to any of clauses 1 to 42.

Clause 44. An apparatus comprising means for performing a method according to any of clauses 1 to 42.

Clause 45. A non-transitory computer-readable medium storing computer-executable instructions, the computer-executable comprising at least one instruction for causing a computer or processor to perform a method according to any of clauses 1 to 42.

Additional implementation examples are described in the following numbered clauses:

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
   receiving one or more physical downlink control channels (PDCCHs), one or more physical downlink shared channels (PDSCHs), or both from at least a first transmission-reception point (TRP), a second TRP, or both;
   performing one or more positioning measurements of the one or more PDCCHs, the one or more PDSCHs, or both; and
   reporting, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both, wherein the one or more positioning measurements, the timestamp, and the one or more properties are reported to the network node to enable the network node to determine whether the first TRP, the second TRP, or both transmitted the one or more PDCCHs, the one or more PDSCHs, or both.

2. The method of claim 1, further comprising:
   receiving a single downlink control information (DCI) associated with both the first TRP and the second TRP.

3. The method of claim 1, further comprising:
   receiving a single PDSCH associated with both the first TRP and the second TRP.

4. A method of wireless communication performed by a user equipment (UE), comprising:
   receiving one or more physical downlink control channels (PDCCHs), one or more physical downlink shared channels (PDSCHs), or both from at least a first transmission-reception point (TRP), a second TRP, or both;
   performing one or more positioning measurements of the one or more PDCCHs, the one or more PDSCHs, or both; and
   reporting, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both, wherein the one or more properties of the QCL source comprise (1) at least one transmission configuration indicator (TCI) state associated with the one or more PDCCHs, the one or more PDSCHs, or both, (2) a control resource set (CORESET) pool index associated with the one or more PDCCHs, the one or more PDSCHs, or both, or (3) both the at least one TCI state and the CORESET pool index.

5. The method of claim 4, further comprising:
   receiving one or more TCI codepoints, each TCI codepoint including one or more TCI states, each TCI codepoint associated with one of the first TRP and the second TRP, wherein the at least one TCI state is one of the one or more TCI states of one of the one or more TCI codepoints.

6. The method of claim 5, wherein the one or more TCI codepoints are received from a serving base station via medium access control control element (MAC-CE) signaling or radio resource control (RRC) signaling.

7. The method of claim 1, further comprising:
   receiving DCI associated with each of the first TRP and the second TRP.

8. The method of claim 4, further comprising:
   receiving a plurality of CORESET pool indexes for a corresponding plurality of CORESETS for an active bandwidth part (BWP) for a serving cell used by the first TRP and the second TRP, wherein the CORESET pool index associated with the one or more PDCCHs, the one or more PDSCHs, or both is one of the plurality of CORESET pool indexes.

9. The method of claim 8, wherein the plurality of CORESET pool indexes are received from a serving base station in medium access control control element (MAC-CE) signaling or radio resource control (RRC) signaling.

10. The method of claim 1, wherein the QCL source comprises a channel state information reference signal (CSI-RS), a demodulation reference signal (DMRS), a tracking reference signal (TRS), or a synchronization signal block (SSB) transmitted by whichever of the first TRP and the second TRP transmitted the one or more PDCCHs, the one or more PDSCHs, or both.

11. The method of claim 1, wherein the first TRP and the second TRP operate in a single serving cell for the UE.

12. The method of claim 1, wherein the network node comprises a base station serving the UE or a location server.

13. The method of claim 1, wherein the one or more positioning measurements comprise a reference signal received power (RSRP) measurement, reference signal time different (RSTD) measurement, reception-to-transmission (Rx-Tx) time difference measurement, an angle measurement, or any combination thereof.

14. A method of wireless communication performed by a network node, comprising:
   receiving, from a user equipment (UE), one or more positioning measurements of one or more physical downlink control channels (PDCCHs), one or more physical downlink shared channels (PDSCHs), or both received at the UE from at least a first transmission-reception point (TRP), a second TRP, or both, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and
   determining a TRP identifier of whichever of the first TRP and the second TRP transmitted the one or more PDCCHs, the one or more PDSCHs, or both based on at least the timestamp and the one or more properties of the QCL source.

15. The method of claim 14, wherein the network node is a serving base station for the UE.

16. The method of claim 15, wherein the one or more positioning measurements, the timestamp, and the one or more properties of the QCL source are received from the UE.

17. The method of claim 15, wherein the one or more properties of the QCL source comprise at least one transmission configuration indicator (TCI) state associated with the one or more PDCCHs, the one or more PDSCHs, or both.

18. The method of claim 17, further comprising:
   transmitting, to the UE, one or more TCI codepoints, each TCI codepoint including one or more TCI states, each TCI codepoint associated with one of the first TRP and the second TRP, wherein the at least one TCI state is one of the one or more TCI states of one of the one or more TCI codepoints.

19. The method of claim 15, wherein the one or more properties of the QCL source comprise a control resource set (CORESET) pool index associated with the one or more PDCCHs, the one or more PDSCHs, or both.

20. The method of claim 19, further comprising:
transmitting, to the UE, a plurality of CORESET pool indexes for a corresponding plurality of CORESETS for an active bandwidth part (BWP) for a serving cell used by the first TRP and the second TRP, wherein the CORESET pool index associated with the one or more PDCCHs, the one or more PDSCHs, or both is one of the plurality of CORESET pool indexes.

21. The method of claim 15, further comprising:
transmitting the one or more positioning measurements and the TRP identifier to a location server to enable the location server to calculate an estimate of a location of the UE.

22. The method of claim 15, further comprising:
calculating an estimate of a location of the UE based on at least the one or more positioning measurements and the TRP identifier.

23. The method of claim 14, wherein the network node is a location server.

24. The method of claim 23, wherein the one or more properties of the QCL source comprise at least one transmission configuration indicator (TCI) state associated with the one or more PDCCHs, the one or more PDSCHs, or both.

25. The method of claim 24, further comprising:
receiving, from a serving base station for the UE, an association between the UE and one or more TCI codepoints, each TCI codepoint including one or more TCI states, each TCI codepoint associated with one of the first TRP and the second TRP, wherein the at least one TCI state is one of the one or more TCI states of one of the one or more TCI codepoints; and
receiving, from the serving base station, timestamps indicating times during which the one or more TCI codepoints were associated with the first TRP or the second TRP.

26. The method of claim 25, wherein determining the TRP identifier is further based on the association and the timestamps received from the serving base station.

27. The method of claim 23, wherein the one or more properties of the QCL source comprise a control resource set (CORESET) pool index associated with the one or more PDCCHs, the one or more PDSCHs, or both.

28. The method of claim 27, further comprising:
receiving, from a serving base station for the UE, an association between the UE and a plurality of CORESET pool indexes for a corresponding plurality of CORESETS for an active bandwidth part (BWP) for a serving cell used by the first TRP and the second TRP, wherein the CORESET pool index associated with the one or more PDCCHs, the one or more PDSCHs, or both is one of the plurality of CORESET pool indexes; and
receiving, from the serving base station, timestamps indicating times during which the plurality of CORESET pool indexes were associated with the first TRP or the second TRP.

29. The method of claim 28, wherein determining the TRP identifier is further based on the association and the timestamps received from the serving base station.

30. The method of claim 23, further comprising:
calculating an estimate of a location of the UE based on at least the one or more positioning measurements and the TRP identifier.

31. The method of claim 14, wherein the QCL source comprises a channel state information reference signal (CSI-RS), a demodulation reference signal (DMRS), a tracking reference signal (TRS), or a synchronization signal block (SSB) transmitted by whichever of the first TRP and the second TRP transmitted the one or more PDCCHs, the one or more PDSCHs, or both.

32. A user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, a physical downlink control channel (PDCCH), a physical downlink shared channel (PDSCH), or both from at least a first transmission-reception point (TRP), a second TRP, or both;
perform one or more positioning measurements of the one or more PDCCHs, the one or more PDSCHs, or both; and
report, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both, wherein the one or more positioning measurements, the timestamp, and the one or more properties are reported to the network node to enable the network node to determine whether the first TRP, the second TRP, or both transmitted the one or more PDCCHs, the one or more PDSCHs, or both.

33. The UE of claim 32, wherein the one or more processors, either alone or in combination, are further configured to:
receive, via the at least one or more transceivers, a single downlink control information (DCI) for both the first TRP and the second TRP.

34. The UE of claim 32, wherein the one or more processors, either alone or in combination, are further configured to:
receive, via the one or more transceivers, a single PDSCH associated with both the first TRP and the second TRP.

35. A user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, a physical downlink control channel (PDCCH), a physical downlink shared channel (PDSCH), or both from at least a first transmission-reception point (TRP), a second TRP, or both;
perform one or more positioning measurements of the one or more PDCCHs, the one or more PDSCHs, or both; and
report, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both, wherein the one or more properties of the QCL source comprise (1) at least one transmission configuration indicator (TCI)

state associated with the one or more PDCCHs, the one or more PDSCHs, or both, (2) a control resource set (CORESET) pool index associated with the one or more PDCCHs, the one or more PDSCHs, or both, or (3) both the at least one TCI state and the CORESET pool index.

36. The UE of claim 35, wherein the one or more processors, either alone or in combination, are further configured to:
receive, via the one or more transceivers, one or more TCI codepoints, each TCI codepoint including one or more TCI states, each TCI codepoint associated with one of the first TRP and the second TRP, wherein the at least one TCI state is one of the one or more TCI states of one of the one or more TCI codepoints.

37. The UE of claim 36, wherein the one or more TCI codepoints are received from a serving base station via medium access control control element (MAC-CE) signaling or radio resource control (RRC) signaling.

38. The UE of claim 32, wherein the one or more processors, either alone or in combination, are further configured to:
receive, via the one or more transceivers, DCI from each of the first TRP and the second TRP.

39. The UE of claim 35, wherein the one or more processors, either alone or in combination, are further configured to:
receive, via the one or more transceivers, a plurality of CORESET pool indexes for a corresponding plurality of CORESETS for an active bandwidth part (BWP) for a serving cell used by the first TRP and the second TRP, wherein the CORESET pool index associated with the one or more PDCCHs, the one or more PDSCHs, or both is one of the plurality of CORESET pool indexes.

40. The UE of claim 39, wherein the plurality of CORESET pool indexes are received from a serving base station in medium access control control element (MAC-CE) signaling or radio resource control (RRC) signaling.

41. The UE of claim 32, wherein the QCL source comprises a channel state information reference signal (CSI-RS), a demodulation reference signal (DMRS), a tracking reference signal (TRS), or a synchronization signal block (SSB) transmitted by whichever of the first TRP and the second TRP transmitted the one or more PDCCHs, the one or more PDSCHs, or both.

42. The UE of claim 32, wherein the first TRP and the second TRP operate in a single serving cell for the UE.

43. The UE of claim 32, wherein the network node comprises a base station serving the UE or a location server.

44. The UE of claim 32, wherein the one or more positioning measurements comprise a reference signal received power (RSRP) measurement, reference signal time different (RSTD) measurement, reception-to-transmission (Rx-Tx) time difference measurement, an angle measurement, or any combination thereof.

45. A network node, comprising:
one or more memories;
one or more transceivers; and
one or more processors communicatively coupled to the one or more memories and the one or more transceivers, the one or more processors, either alone or in combination, configured to:
receive, via the one or more transceivers, from a user equipment (UE), one or more positioning measurements of a physical downlink control channel (PDCCH), a physical downlink shared channel (PDSCH), or both received at the UE from at least a first transmission-reception point (TRP) or a second TRP, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and
determine a TRP identifier of whichever of the first TRP and the second TRP transmitted the one or more PDCCHs, the one or more PDSCHs, or both based on at least the timestamp and the one or more properties of the QCL source.

46. The network node of claim 45, wherein the network node is a serving base station for the UE.

47. The network node of claim 46, wherein the one or more positioning measurements, the timestamp, and the one or more properties of the QCL source are received from the UE.

48. The network node of claim 46, wherein the one or more properties of the QCL source comprise at least one transmission configuration indicator (TCI) state associated with the one or more PDCCHs, the one or more PDSCHs, or both.

49. The network node of claim 48, wherein the one or more processors, either alone or in combination, are further configured to:
transmit, via the one or more transceivers, to the UE, one or more TCI codepoints, each TCI codepoint including one or more TCI states, each TCI codepoint associated with one of the first TRP and the second TRP, wherein the at least one TCI state is one of the one or more TCI states of one of the one or more TCI codepoints.

50. The network node of claim 46, wherein the one or more properties of the QCL source comprise a control resource set (CORESET) pool index associated with the one or more PDCCHs, the one or more PDSCHs, or both.

51. The network node of claim 50, wherein the one or more processors, either alone or in combination, are further configured to:
transmit, via the one or more transceivers, to the UE, a plurality of CORESET pool indexes for a corresponding plurality of CORESETS for an active bandwidth part (BWP) for a serving cell used by the first TRP and the second TRP, wherein the CORESET pool index associated with the one or more PDCCHs, the one or more PDSCHs, or both is one of the plurality of CORESET pool indexes.

52. The network node of claim 46, wherein the one or more processors, either alone or in combination, are further configured to:
transmit, via the one or more transceivers, the one or more positioning measurements and the TRP identifier to a location server to enable the location server to calculate an estimate of a location of the UE.

53. The network node of claim 46, wherein the one or more processors, either alone or in combination, are further configured to:
calculate an estimate of a location of the UE based on at least the one or more positioning measurements and the TRP identifier.

54. The network node of claim 45, wherein the network node is a location server.

55. The network node of claim 54, wherein the one or more properties of the QCL source comprise at least one transmission configuration indicator (TCI) state associated with the one or more PDCCHs, the one or more PDSCHs, or both.

56. The network node of claim 55, wherein the one or more processors, either alone or in combination, are further configured to:
receive, via the one or more transceivers, from a serving base station for the UE, an association between the UE and one or more TCI codepoints, each TCI codepoint including one or more TCI states, each TCI codepoint associated with one of the first TRP and the second TRP, wherein the at least one TCI state is one of the one or more TCI states of one of the one or more TCI codepoints; and
receive, via the one or more transceivers, from the serving base station, timestamps indicating times during which the one or more TCI codepoints were associated with the first TRP or the second TRP.

57. The network node of claim 56, wherein the one or more processors being configured to determine the TRP identifier is further based on the association and the timestamps received from the serving base station.

58. The network node of claim 54, wherein the one or more properties of the QCL source comprise a control resource set (CORESET) pool index associated with the one or more PDCCHs, the one or more PDSCHs, or both.

59. The network node of claim 58, wherein the one or more processors, either alone or in combination, are further configured to:
receive, via the one or more transceivers, from a serving base station for the UE, an association between the UE and a plurality of CORESET pool indexes for a corresponding plurality of CORESETS for an active bandwidth part (BWP) for a serving cell used by the first TRP and the second TRP, wherein the CORESET pool index associated with the one or more PDCCHs, the one or more PDSCHs, or both is one of the plurality of CORESET pool indexes; and
receive, via the one or more transceivers, from the serving base station, timestamps indicating times during which the plurality of CORESET pool indexes were associated with the first TRP or the second TRP.

60. The network node of claim 59, wherein the one or more processors are configured to determine the TRP identifier further based on the association and the timestamps received from the serving base station.

61. The network node of claim 54, wherein the one or more processors, either alone or in combination, are further configured to:
calculate an estimate of a location of the UE based on at least the one or more positioning measurements and the TRP identifier.

62. The network node of claim 45, wherein the QCL source comprises a channel state information reference signal (CSI-RS), a demodulation reference signal (DMRS), a tracking reference signal (TRS), or a synchronization signal block (SSB) transmitted by whichever of the first TRP and the second TRP transmitted the one or more PDCCHs, the one or more PDSCHs, or both.

63. A user equipment (UE), comprising:
means for receiving one or more physical downlink control channels (PDCCHs), one or more physical downlink shared channels (PDSCHs), or both from at least a first transmission-reception point (TRP), a second TRP, or both;
means for performing one or more positioning measurements of the one or more PDCCHs, the one or more PDSCHs, or both; and
means for reporting, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both, wherein the one or more positioning measurements, the timestamp, and the one or more properties are reported to the network node to enable the network node to determine whether the first TRP, the second TRP, or both transmitted the one or more PDCCHs, the one or more PDSCHs, or both.

64. A network node, comprising:
means for receiving, from a user equipment (UE), one or more positioning measurements of one or more physical downlink control channels (PDCCHs), one or more physical downlink shared channels (PDSCHs), or both received at the UE from at least a first transmission-reception point (TRP), a second TRP, or both, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and
means for determining a TRP identifier of whichever of the first TRP and the second TRP transmitted the one or more PDCCHs, the one or more PDSCHs, or both based on at least the timestamp and the one or more properties of the QCL source.

65. A non-transitory computer-readable medium storing computer-executable instructions that, when executed by a user equipment (UE), cause the UE to:
receive one or more physical downlink control channels (PDCCHs), one or more physical downlink shared channels (PDSCHs), or both from at least a first transmission-reception point (TRP), a second TRP, or both;
perform one or more positioning measurements of the one or more PDCCHs, the one or more PDSCHs, or both; and
report, to a network node, the one or more positioning measurements, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both, wherein the one or more positioning measurements, the timestamp, and the one or more properties are reported to the network node to enable the network node to determine whether the first TRP, the second TRP, or both transmitted the one or more PDCCHs, the one or more PDSCHs, or both.

66. A non-transitory computer-readable medium storing computer-executable instructions that, when executed by a network node, cause the network node to:
receive, from a user equipment (UE), one or more positioning measurements of one or more physical downlink control channels (PDCCHs), one or more physical downlink shared channels (PDSCHs), or both received at the UE from at least a first transmission-reception point (TRP), a second TRP, or both, a timestamp associated with the one or more PDCCHs, the one or more PDSCHs, or both or the one or more positioning measurements, and one or more properties of a quasi-co-location (QCL) source associated with the one or more PDCCHs, the one or more PDSCHs, or both; and
determine a TRP identifier of whichever of the first TRP and the second TRP transmitted the one or more PDCCHs, the one or more PDSCHs, or both based on at least the timestamp and the one or more properties of the QCL source.

* * * * *